(12) United States Patent
Somani et al.

(10) Patent No.: US 10,756,899 B2
(45) Date of Patent: Aug. 25, 2020

(54) ACCESS TO SOFTWARE APPLICATIONS

(71) Applicant: BlackBerry Limited, Waterloo (CA)

(72) Inventors: Haniff Somani, Mercer Island, WA (US); Siavash James Joorabchian Hawkins, Dover, DE (US)

(73) Assignee: BlackBerry Limited, Waterloo, Ontario (CA)

(*) Notice: Subject to any disclaimer, the term of this patent is extended or adjusted under 35 U.S.C. 154(b) by 312 days.

(21) Appl. No.: 15/513,666

(22) PCT Filed: Sep. 23, 2015

(86) PCT No.: PCT/US2015/051773
§ 371 (c)(1),
(2) Date: Mar. 23, 2017

(87) PCT Pub. No.: WO2016/049222
PCT Pub. Date: Mar. 31, 2016

(65) Prior Publication Data
US 2017/0310480 A1    Oct. 26, 2017

Related U.S. Application Data

(60) Provisional application No. 62/055,857, filed on Sep. 26, 2014.

(51) Int. Cl.
*G06F 21/00* (2013.01)
*H04L 9/32* (2006.01)
(Continued)

(52) U.S. Cl.
CPC ............ *H04L 9/3226* (2013.01); *G06F 21/31* (2013.01); *G06F 21/602* (2013.01);
(Continued)

(58) Field of Classification Search
None
See application file for complete search history.

(56) References Cited

U.S. PATENT DOCUMENTS

| 6,684,259 B1* | 1/2004 | Discavage | .......... G06F 9/45537 |
| | | | 709/201 |
| 2005/0022204 A1* | 1/2005 | Kabir | ................ H04L 29/12594 |
| | | | 718/108 |

(Continued)

FOREIGN PATENT DOCUMENTS

CN    103886270    6/2014

OTHER PUBLICATIONS

Extended European Search Report issued in European Application No. 15843553.7 dated May 7, 2018, 8 pages.
(Continued)

*Primary Examiner* — Jeffery L Williams
(74) *Attorney, Agent, or Firm* — Fish & Richardson P.C.

(57) ABSTRACT

A computing device stores a set of executable code comprising first, second and third subsets of data. The first and second subsets of data comprise first and second encrypted data, respectively. Responsive to receipt of first authentication data for authenticating a respective user, the computing device is arranged to decrypt one of the first and second encrypted data to generate decrypted data, and to configure the third subset of data based on the decrypted data. The third subset of data, having been so configured, is executable by the one or more processors using the operating system to perform one or more tasks on behalf of the respective user. Thus an application-level log in is provided.

20 Claims, 14 Drawing Sheets

(51) Int. Cl.
*G06F 21/62* (2013.01)
*H04W 12/06* (2009.01)
*H04W 12/08* (2009.01)
*G06F 21/31* (2013.01)
*G06F 21/60* (2013.01)
*H04L 9/14* (2006.01)

(52) U.S. Cl.
CPC ............ *G06F 21/6245* (2013.01); *H04L 9/14* (2013.01); *H04W 12/06* (2013.01); *H04W 12/08* (2013.01); *G06F 2221/2107* (2013.01)

(56) References Cited

U.S. PATENT DOCUMENTS

| | | | | |
|---|---|---|---|---|
| 2005/0114686 | A1* | 5/2005 | Ball | G06F 21/78 713/193 |
| 2007/0297608 | A1* | 12/2007 | Jonas | H04L 9/0822 380/259 |
| 2011/0113092 | A1* | 5/2011 | Rakowski | G06F 9/44505 709/203 |
| 2012/0102574 | A1* | 4/2012 | Schentrup | G06F 21/6218 726/28 |
| 2012/0129503 | A1* | 5/2012 | Lindeman | H04L 67/34 455/414.1 |
| 2012/0131685 | A1* | 5/2012 | Broch | G06F 21/554 726/30 |
| 2014/0250505 | A1* | 9/2014 | Kim | H04W 12/08 726/5 |
| 2017/0310480 | A1* | 10/2017 | Somani | G06F 21/6245 |
| 2018/0373886 | A1* | 12/2018 | Quinlan | G06F 21/6218 |

OTHER PUBLICATIONS

International Search Report and Written Opinion issued in International Application No. PCT/US2015/051773 dated Dec. 28, 2015; 9 pages.
Communication Pursuant to Article 94 (3) issued in European Application No. 15843553.7 dated Jun. 6, 2019, 13 pages.
Communication Pursuant to Article 94 (3) EPC issued in European Application No. 15843553.7 dated Jan. 16, 2020, 15 pages.

* cited by examiner

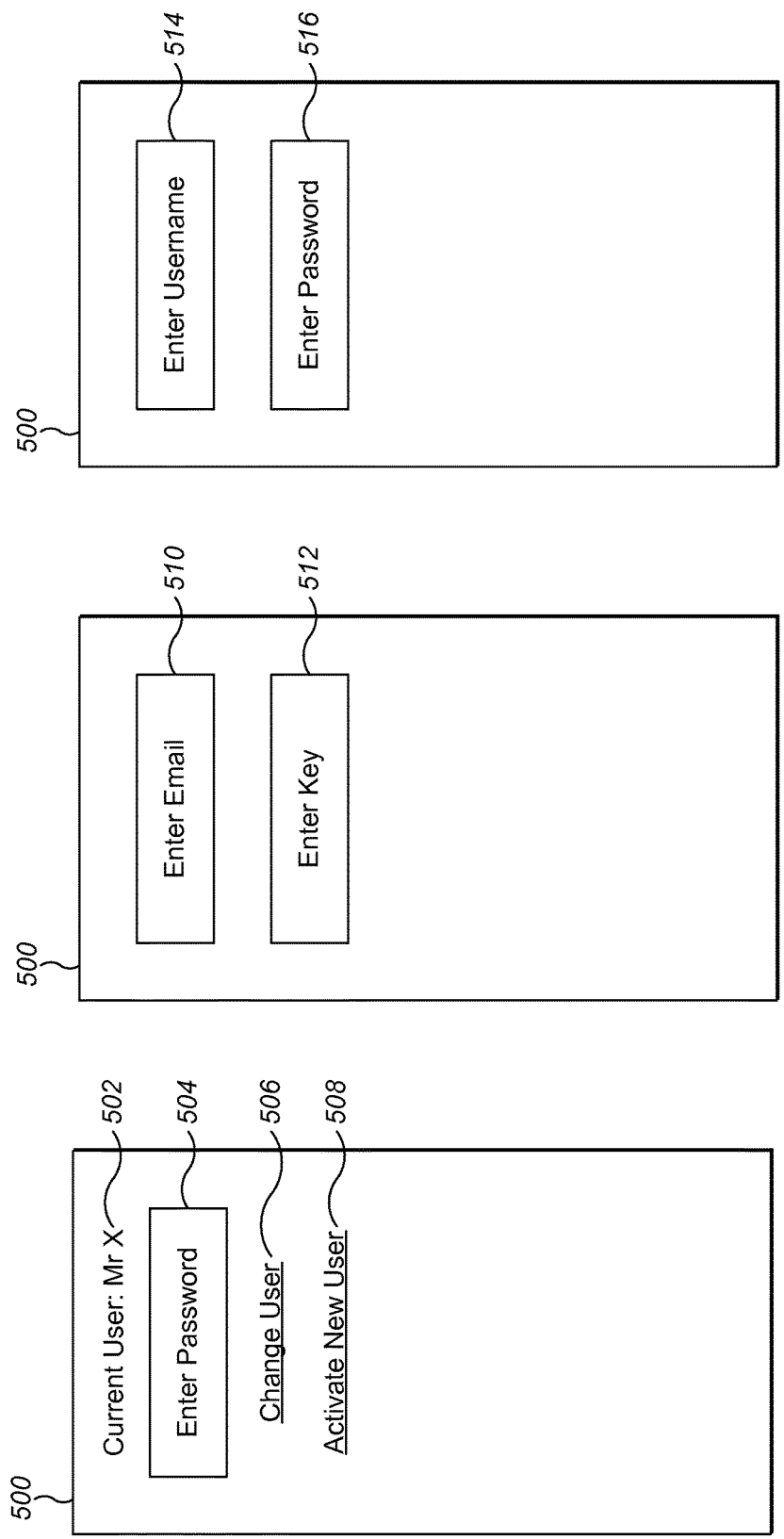

ACCESS TO SOFTWARE APPLICATIONS

CROSS-REFERENCE TO RELATED APPLICATIONS

This application is a U.S. National Stage of PCT/US2015/051773 filed on Sep. 23, 2015, which claims the benefit of U.S. Provisional Application No. 62/055,857, filed Sep. 26, 2014, the contents of which are hereby incorporated in their entirety.

BACKGROUND OF THE INVENTION

Field of the Invention

The present invention relates to the provision of access to software applications.

Description of the Related Technology

User terminals such as mobile telephones, laptop computers, desktop computers and the like often execute software applications that perform various tasks on behalf of a user. Such applications may be pre-installed on the user device, such that they are held on the device at the time of purchase, or they may be installed on the device subsequent to purchase.

In many cases, the applications may be shared between different users, or used by the same user in relation to a different organization. For example, different workers associated with an enterprise may use one or more applications allowing them to check off work instructions as they complete them. However, where a first user resumes use of the application after it has been used by a second user, the state of the application typically has been altered by the second user, and is therefore different to the state in which the first user left the application, causing inconvenience for him or her.

In another example, the same user may use the same applications stored on his or her device for multiple purposes. For example, a consultant may work for multiple enterprises, and use the applications on his or her device to perform tasks in relation to each of the enterprises for which he or she works. However, this can result in the inadvertent sharing of data between the different enterprises, which may result in poor security including data loss and/or violation of compliance rules.

It is an object of the present invention to at least mitigate at least one of the problems of the prior art.

SUMMARY

According to a first aspect, there is provided a computing device comprising one or more data stores and one or more processors, the one or more data stores being configured to store: an operating system of the computing device; and a set of executable code comprising first, second and third subsets of data, the first subset of data comprising first encrypted data and the second subset of data comprising second encrypted data, the first encrypted data being different from the second encrypted data, wherein, responsive to receipt of first authentication data for authenticating a first user, the computing device is arranged to decrypt said first encrypted data to generate first decrypted data, and to configure the third subset of data based on the first decrypted data so that the third subset of data is executable by the one or more processors using the operating system to perform one or more tasks on behalf of the first user; and responsive to receipt of second authenticating data for authenticating a second user, the computing device is arranged to decrypt said second encrypted data to generate second decrypted data, and to configure the third subset of data based on the second decrypted data so that the third subset of data is executable by the one or more processors using the operating system to perform one or more tasks on behalf of the second user.

The computing device may be arranged to store: a first plurality of subsets of encrypted data including the first subset of data; a first plurality of encryption keys stored in encrypted form, wherein each of the first plurality of subsets of encrypted data can be decrypted using a respective one of the first plurality of encryption keys; a second plurality of subsets of encrypted data, the second plurality of subsets of encrypted data including the second subset of data; and a second plurality of encryption keys stored in encrypted form, wherein each of the second plurality of subsets of encrypted data can be decrypted using a respective one of the second plurality of encryption keys, wherein responsive to receipt of the first authentication data, the computing device is arranged to: decrypt the first plurality of encryption keys; use the decrypted first plurality of encryption keys to decrypt each of the first plurality of subsets of encrypted data; and configure the third subset of data in a first configuration, based on the decrypted first plurality of subsets of data, so that the third subset of data is executable by the one or more processors using the operating system to perform one or more tasks on behalf of the first user, wherein responsive to receipt of the second authentication data, the computing device is arranged to: decrypt the second plurality of encryption keys; use the decrypted second plurality of encryption keys to decrypt each of the second plurality of subsets of encrypted data; and configure the third subset of data in a second configuration, based on the decrypted second plurality of subsets of data so that the third subset of data is executable by the one or more processors using the operating system to perform one or more tasks on behalf of the second user.

The encryption first and second plurality of encryption keys may be referred to as "data encryption keys (DEK)" herein.

The one or more data stores may be arranged to store a first further encryption key in encrypted form and a second further key in encrypted form, wherein, responsive to receipt of the first authentication data, the computing device may be arranged to: use the first authentication data to decrypt the first further encryption key; and use the decrypted first further encryption key to decrypt the first plurality of encryption keys, wherein, responsive to receipt of the second authentication data, the computing device may be arranged to: use the second authentication data to decrypt the second further encryption key; and use the decrypted second further encryption key to decrypt the second plurality of encryption keys.

The "further encryption keys" may be referred to herein as container keys (CK) herein.

According to a second aspect, there is provided non-transitory computer-readable storage medium comprising computer-executable instructions which, when executed by a processor, cause a computing device to perform a method of authenticating a user, the computing device comprising one or more data stores configured to store an operating system of the computing device, and the method comprising: storing, in the one or more data stores, a set of executable code comprising first, second and third subsets of data, the first subset of data comprising first encrypted data and the second subset of data comprising second encrypted data, the first encrypted data being different from the second encrypted data; responsive to receipt of first authentication data for authenticating a first user, decrypting said first encrypted data to generate first decrypted data, and to configure the third subset of data based on the first decrypted data so that the third subset of data is executable by the one or more processors using the operating system to perform one or more tasks on behalf of the first user; and responsive to receipt of second authenticating data for authenticating a second user, decrypting said second encrypted data to generate second decrypted data, and to configure the third subset of data based on the second decrypted data so that the third subset of data is executable by the one or more processors using the operating system to perform one or more tasks on behalf of the second user.

According to a third aspect, there is provided method of authenticating a user at a computing device, the computing device comprising one or more data stores configured to store an operating system of the computing device, and the method comprising: storing, in the one or more data stores, a set of executable code comprising first, second and third subsets of data, the first subset of data comprising first encrypted data and the second subset of data comprising second encrypted data, the first subset of encrypted data being different from the second subset of encrypted data; responsive to receipt of first authentication data for authenticating a first user, decrypting said first encrypted data to generate first decrypted data, and to configure the third subset of data based on the first decrypted data so that the third subset of data is executable by the one or more processors using the operating system to perform one or more tasks on behalf of the first user; and responsive to receipt of second authenticating data for authenticating a second user, decrypting said second encrypted data to generate second decrypted data, and to configure the third subset of data based on the second decrypted data so that the third subset of data is executable by the one or more processors using the operating system to perform one or more tasks on behalf of the second user.

Further features and advantages of embodiments of the invention will become apparent from the following description of some preferred embodiments of the invention, given by way of example only, which is made with reference to the accompanying drawings.

BRIEF DESCRIPTION OF THE DRAWINGS

FIGS. 5*a* to 5*c* are schematic diagrams illustrating a user interface (UI) for authenticating a user in accordance with an embodiment;

DETAILED DESCRIPTION OF CERTAIN INVENTIVE EMBODIMENTS

Figure 1:
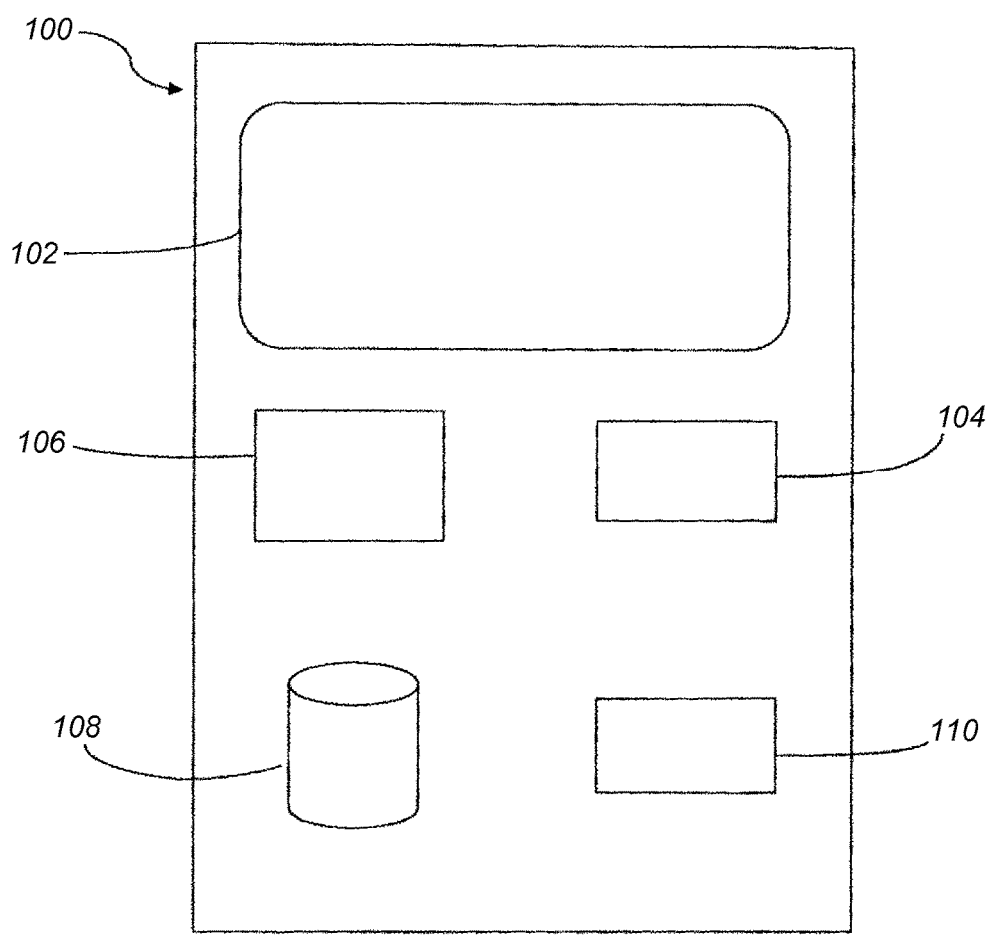
FIG. 1 is a schematic block diagram illustrating components of a user terminal in accordance with an embodiment.

FIG. 1 is a schematic diagram showing components of an example of a computing device in the form of a user terminal 100 according to embodiments. The user terminal 100 may be a portable computing device 100 such as a mobile telephone (for example, a smart phone), a Personal Digital Assistant (PDA), tablet computer or notebook computer etc.

The user terminal 100 includes a display screen 102, which may be a touch screen which can receive user input, and/or the user terminal 100 may have a separate input device such as a keyboard 104 or some pointing device (not shown), which may be integral or connected wirelessly or by wired connection to the user terminal 100. The user terminal 100 further includes a processor 106 and a data store 108. The data store 108 may include one or more computer-readable media. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The processor 106 is arranged to process instructions stored in the data store 108. These instructions are in the form of computer software in the form of one or more programs that implement an operating system; exemplary operating systems include the APPLE® iOS operating system, the ANDROID™ operating system, the WINDOWS PHONE® operating system and the MICROSOFT® WINDOWS® operating system. The operating systems of such user devices typically provide frameworks that allow for applications to communicate and interoperate, and act as intermediaries between the applications and the corresponding hardware. Applications thus use the operating system when performing tasks on behalf of a user.

Reference herein to the user terminal 100 performing functions and processes should be understood as including the processor 106 performing by executing instructions store in the data store 108, as applicable.

The data store 108 is also used by programs running on the processor 106 as a means of storing and accessing data in the form of electronic signals where the data is used during the execution of the programs. The operating system provides a file system for storing, modifying and accessing files held in the data store. This file system may be accessible by other programs running on the processor 106 via the programmatic interface provided by the operating system. Programs running on the processor 106 also process user input received from, for example, the touch screen 102 or keyboard 104, etc. The user terminal 100 also includes a network interface 110 (or a plurality of such interfaces) which allows programs running on the processor 106 to transmit and receive data to and from other devices and systems via a communications network (or a plurality of such networks), via wired and/or wireless connections.

Figure 2:
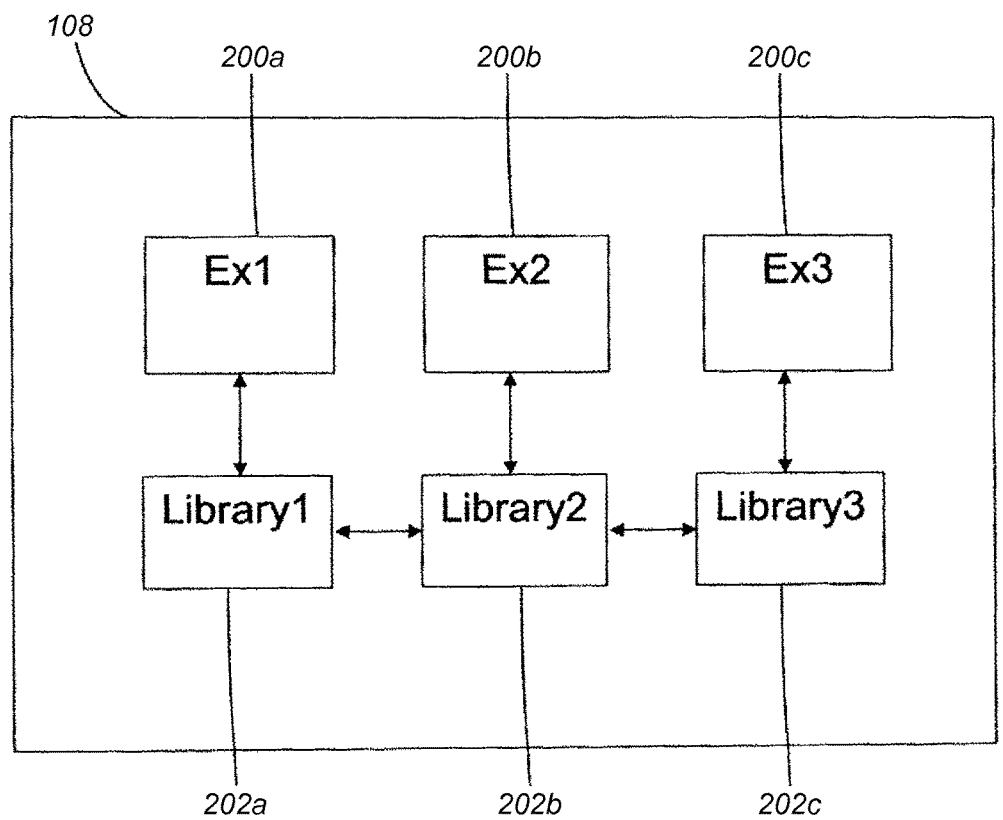
FIG. 2 is a schematic diagram showing software components held in a data store of the user terminal illustrated in FIG. 1.

As shown schematically in FIG. 2, the data store 108 may also store one or more sets of executable code Ex1 200*a*, Ex2 200*b* and Ex3 200*c* (herein referred to as "executables 200") for executing applications which perform tasks on the user terminal 100, such as tasks relating to document viewing, word processing, accounting, cryptography, searching etc. The executables 200 may comprise applications native to the operating system in use on the device, which may be pre-installed on the user terminal 100, or may be subsequently installed by the user, for example by downloading the application from a remote data store.

As used herein, the term "application" refers to a unit of functionality that may be executed by application code (discussed below) in an executable. Typically each application is identified by an application ID. An application may also have a plurality of application versions, each identified by a version ID. Different versions of an application may provide different functionality; different users may be entitled to access different versions of the same application. The application code may comprise an Android application package (APK) file or an iOS App Store Package (IPA) file.

The data store 108 may also include a library application programming interface (API) (herein referred to as a "library") which provides a collection of resources used by the executables 200*a*, 200*b*, 200*c*, such as configuration data, message templates, subroutines etc. The library may also facilitate communication between different applications, by for example serializing data for transmission. The library may also access other resources held in the data store, such as a file system, for example the file system of the operating system described above. FIG. 2 shows three instances of a library, namely Library1 202*a*, Library2 202*b* and Library3 202*c* associated with Ex1 200*a*, Ex2 200*b* and Ex3 200*c*, respectively. Whilst three applications and libraries are shown in FIG. 2, it will be understood that user terminals 100 typically include tens or hundreds of executables, though in some embodiments of the invention, the user terminal 100 may store for example only one or two executables.

Figure 3:
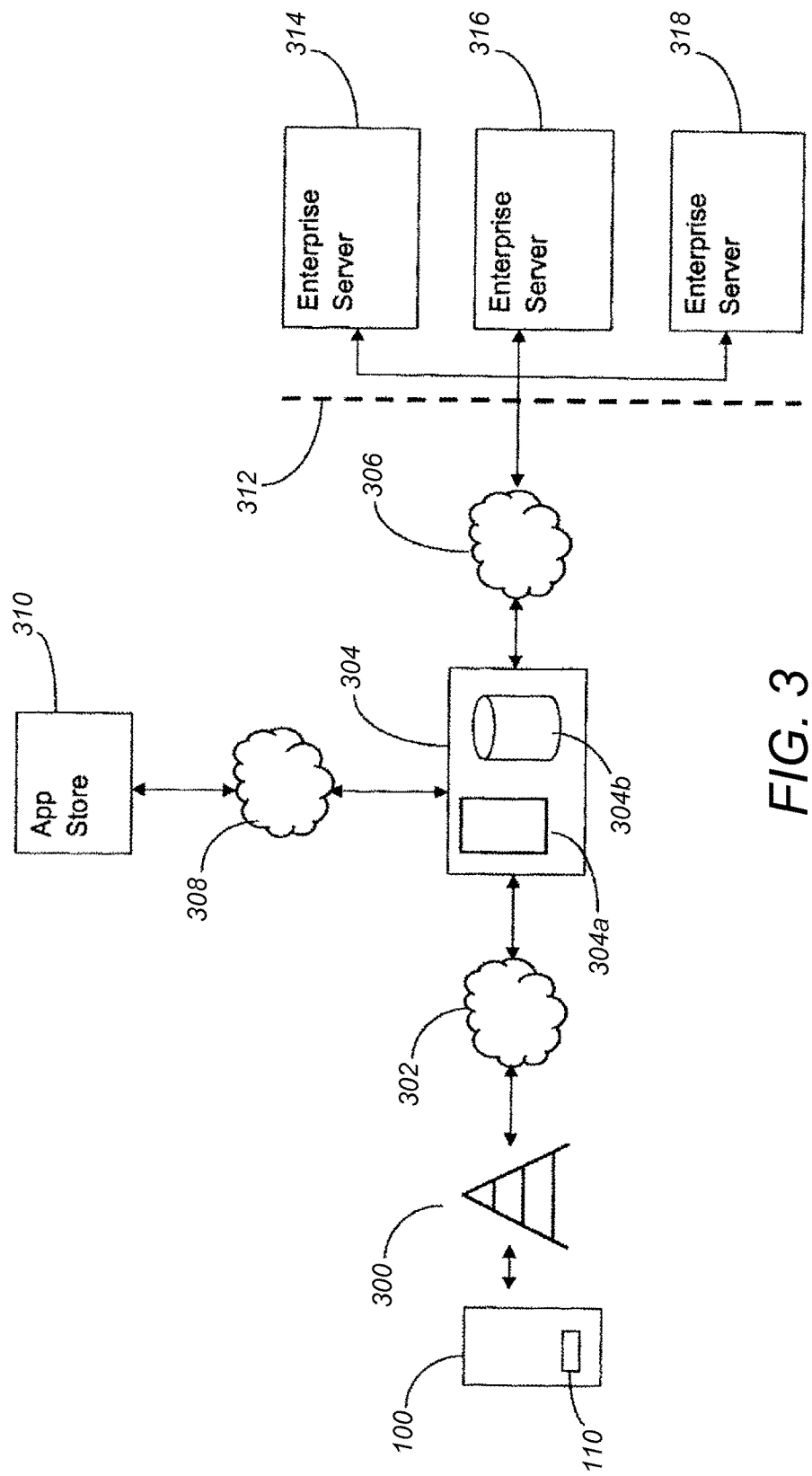
FIG. 3 is a schematic diagram illustrating components of a system for use in an embodiment.

FIG. 3 is a schematic diagram of a system in which the user terminal 100 may operate. The network interface 110 on the user terminal 100 may include a radio access network interface which is able to communicate with a wireless access node 300, such as a base station or a wireless access point, which provides access to a communications network 302. The network interface 110 may be able to connect to the wireless access node 120 using one or more of a number of radio access technologies, including for example Global System for Mobile Communications (GSM), Universal Mobile Telecommunications System (UMTS), Long Term Evolution (LTE), and fixed wireless access (such as IEEE 802.16 WiMax), and wireless networking (such as IEEE 802.11 WiFi). Alternatively or additionally, the network interface 112 may provide for wired connections to the communications network 302, such as via a modem or router or the like.

The user terminal 100 communicates with a server system via the communications network 302; this may be performed using a networking program that allows communication between programs running on the processor 106 and external apparatus via the communications network 302. The server system with which the user terminal communicates includes a Network Operations Center (NOC) 304. The NOC 304 may include a computer server or a plurality of computer servers which can communicate using a communications interface, via a communications network 306, with other remote data processing devices, such as one or more enterprise servers 314, 316, 318 which are connected to an enterprise network (not shown). The NOC 304 includes one or more processors 304*a* and a memory in the form of a database 304*b*.

Access to the one or more enterprise servers 314, 316, 318 and the enterprise network from the communications network 306 may typically be controlled by a firewall 312 between the communications network 306 and the enterprise network such that all network traffic that passes between the communications network 306 and the enterprise network can be monitored and, optionally, inhibited if it does not satisfy criteria enforced by the firewall 312. For example the firewall 312 may be configured to only allow network connections between the NOC 304 and one or more enterprise servers 314, 316, 318, and to discard all other network connections from the communications network 306 to the one or more enterprise servers 314, 316, 318 and/or the enterprise network.

The user terminal 100 may also communicate with other third party computer servers that provide other services, such as an app store 310 for distributing software applications. This may be done via the NOC 304 and a communications network 180 or it may be done without involving the NOC, via the Internet for example.

Figure 4:
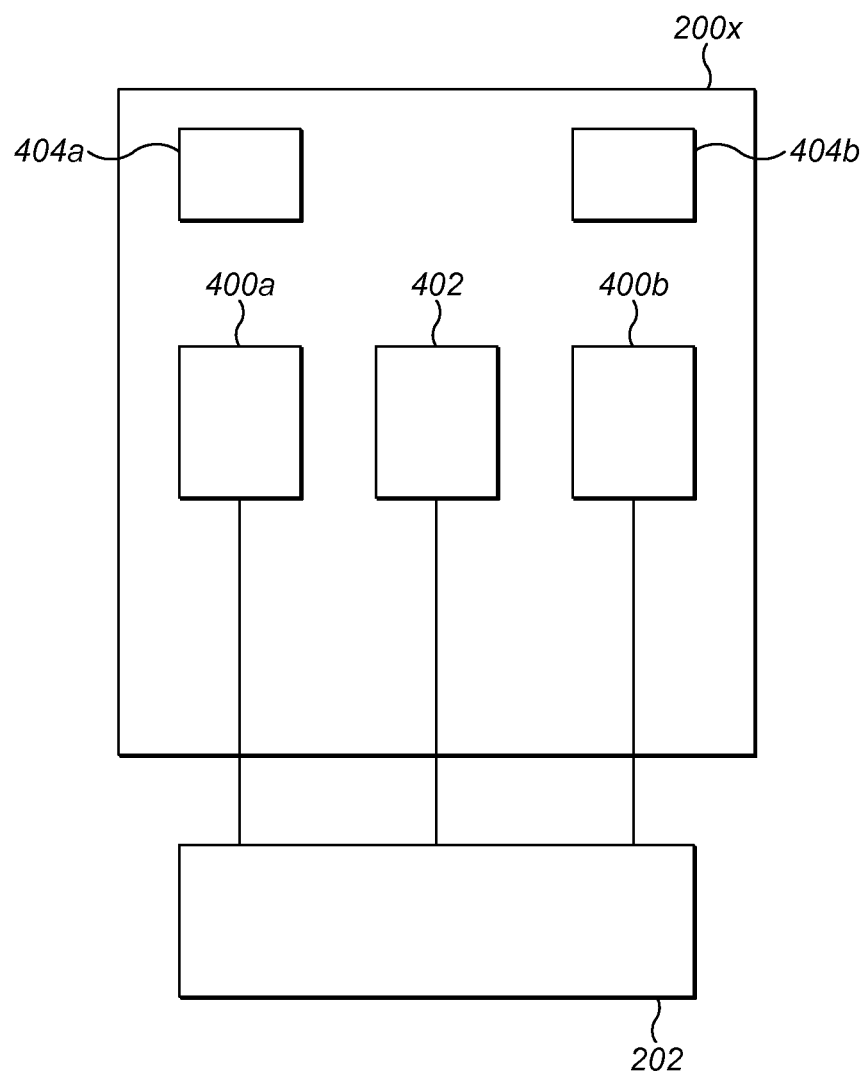
FIG. 4 is a schematic diagram illustrating a first example of an executable in accordance with an embodiment.

FIG. 4 schematically shows an example of an executable 200*x* in accordance with an embodiment, corresponding to any of the executables 200*a*, 200*b* and 200*c* described above. The executable 200*x* includes three subsets of data. The first subset of data 400*a* and the second subset of data 400*b* (herein referred to as first and second containers, respectively) are specific to a respective user, and comprise encrypted data which may be decrypted on provision of authentication data, for example authentication credentials, by the user. The third subset of data (herein referred to as "application code 402") comprises data corresponding to an application (where applicable, a specific version thereof) which can be used together with data from one of the containers 400 to execute a task on behalf of the user associated with the container 400. The application code 402 is identified by the application ID and (where applicable) a version ID. The application code 402 typically comprises code, such as developer written code, which may be pre-installed on the user terminal 100 or which may be installed by user, for example following download from a store accessible via the Internet. The executable 200x also includes user files 404a and 404b, which are described below.

While in the present example the executable 200x includes only one set of application code 402, in some cases, multiple sets of application code 402 may be included in a single executable, each being identified by an application ID and version ID pair.

Each of the containers includes, for example, transport keys, policies and one or more encryption keys for the application code 402. The application code 402 includes code for execution to perform a task. Some or all of the application code 402 may be encrypted using an encryption key held in the containers 400.

When accessing the executable 200x, a user provides authentication data such as authentication credentials, as mentioned above. This may be done via a User Interface (UI) provided by the library 202.

An exemplary UI 500 is shown in FIG. 5a. The UI 500 provides an indication 502 of the current user of the executable 200x, and provides selectable options including a first option 504 to enter a password, a second option 506 to change users, and a third option 508 to activate a new user. The relevant option may be selected by, for example, a touch screen input or mouse click.

We first consider the case in which the user selects the "activate new user" option 508. Selection of the option 508 results in the user being prompted to provide credential information. FIG. 5b shows an example in which the user is prompted to enter an e-mail address into a first field 510 and a key, such as an access key into a second field 512. The access key is typically provided in advance by an administrator, for example an administrator of an enterprise with which the user is associated.

The entered credential information is sent to the NOC 304 along with the corresponding application ID. The NOC 304 verifies that the credentials are valid (e.g. registered at the NOC 304), and that the user is entitled (as a matter of policy defined by the administrator, for example) to access the executable code 402. This exchange of messages in order to establish credentials may take the form of a Diffie-Helman exchange, for example.

Further, an association may be created at the NOC 304 between the user and their provisioning enterprise. Encryption keys, herein referred to as "communications keys" may be exchanged between the user device 100 and the enterprise server 314, 316, 318 of the enterprise with which the user is associated, to enable communication between the executable 200x and the enterprise server 314, 316, 318 behind the enterprise firewall. In some embodiments, the communications keys as described above are not exchanged, but instead session-specific communications keys are used. Security policies are also retrieved from the enterprise server 314, 316, 318.

Once authentication has been completed, the user is prompted to select a username and password for future access to the executable 200x; alternatively, the username and password may have been provided in advance to the user e.g. by the enterprise with which they are associated. It should be noted that the "selected username" may in fact be a "blank" username i.e. an empty string. In the case that the user is initial user (i.e. the first user to activate for the executable 200x), there may be no requirement or option to select a username.

The activation process (and the user interface for performing same) may differ according to whether or not the activating user is the initial user or not. For example, an activating user who is not the initial user may be required to demonstrate that they are a member of the same enterprise as the initial user; this may be done by the provision of an activation code or other validation information provided by the enterprise, for example.

On activation of the executable 200x by an initial user, the user device 100 may receive first policy data, from an enterprise server 314, 316, 318 for example, which determines features of subsequent activations. This first policy data may indicate, for example, that no further users may be activated on the device; that new users may activate, but only from the same enterprise as the first user, or that any new user, irrespective of enterprise may active. Additionally or alternatively, the first policy data may indicate whether the same user (i.e. the first user) may perform further activations, for example for duress login (see below).

The first policy data may be stored in a container generated for the initial user or it may be stored in encrypted form on the device. In the former case only, activation subsequent to that of the initial user can only be performed if the initial user is logged in. This may improve security, as it inhibits new users from activating without the presence of the initial user.

Figure 6:
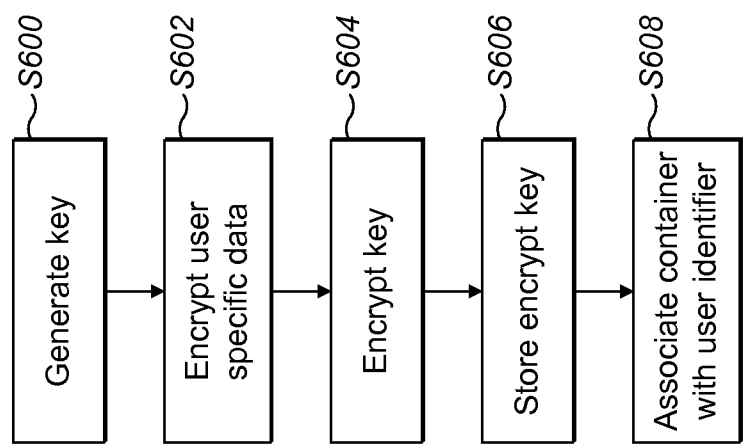
FIG. 6 is a flow diagram showing exemplary steps in a first process for generating a container associated with a user identifier in accordance with an embodiment.

The provision of the username (if applicable) and password enables a container 400 to be generated for the user. An exemplary process according to which the container 402 may be generated is now described with reference to FIG. 6.

According to the exemplary process, the user device 100 generates a key, herein referred to as a "Data Encryption Key (DEK)" at step S600. The DEK may be generated using a mathematical technique, such as a random, or pseudo-random, key generation technique, using for example an Advanced Encryption Standard (AES) algorithm. The master key is used to encrypt the user specific data stored in the container 400 at step S602. The password entered by the user is then used to encrypt the DEK at step S604. This may be done based on a mathematical transform by using the password as a key for the encryption, for example after the password has been stretched and/or hashed using, for example, a Password-Based Key Derivation Function (PB-KDF). The DEK is stored on the user device 100 in encrypted form at step S606. It may be stored in a file, such as one of the user files 404a, 404b referred to above. The password chosen by the user is typically not stored on the user device 100; thus, neither the password nor the DEK need be stored on the user device 100 in unencrypted form, improving security.

While we herein refer to a "password" provided by the user, another secret value may be used; for example, a value stored on an external accessory, such as a smart card or fob readable by the user device 100, and/or biometric information associated with the user may be used instead of or as well as a password. In the case of using biometric information, the user device 100 may include a suitable reader device, such as a fingerprint scanner. Further, the user identifier may additionally or alternatively be provided by an external accessory, such as those described above.

If a secret other than a password is used as described above, Step 600 may comprise, for example, a biometric enrollment process or a process for associating an accessory such as a smart card or fob with the user device 100, where appropriate.

The user device 100 creates an association between the user and the generated user file 400, for example by associating a user identifier, such as the selected username, with the container 400 at step S608. Note that this step may be unnecessary for the initial user of the executable, since at the time at which the initial user activates there is only one user identifier, or no user identifier (if none is required, as discussed above). In the case of no user identifier being used here, a separate identifier may nonetheless be used for purposes such as, for example, authenticating a user to a server, such as an enterprise server 314, 316, 318. The association may be stored in the file system, and be accessible by the library 202. When multiple user files 400 are associated with respective multiple user identifiers, the associations between user files and user identifiers may be stored in the form of a list. Further, an association is also stored between the user file 404 and the container 402 to which it relates. It should be noted that a user identifier may be associated with more than one container 400.

Alternatively, a system may be used in which the location of a container is derivable from a respective user identifier. For example, a user identifier may be used as the input to a hashing algorithm which provides the location of a container as the output. This avoids storing the user identifiers on the device in unencrypted form, improving data privacy.

We now describe an exemplary structure of a container 402 generated according to the above process. In this example, the container 402 includes different parts, herein referred to as a "management part" and an "application part". The management part contains data encrypted using the DEK as described above. The data included in the management part may include the communications keys as described above, management data such as policy data relating to the user and an encryption key, herein referred to as an application key, for the application part. The application part includes data encrypted according to the application key described above; we herein refer to this data as "application data". The application data may include data associated with the user identifier associated with the container 402. For example, the application data may include settings data relating to user-specific settings, or user-specific content used by the application, such as data saved on behalf of a user. Alternatively or additionally the application data may indicate a location of the user-specific data within the file system.

Figure 7:
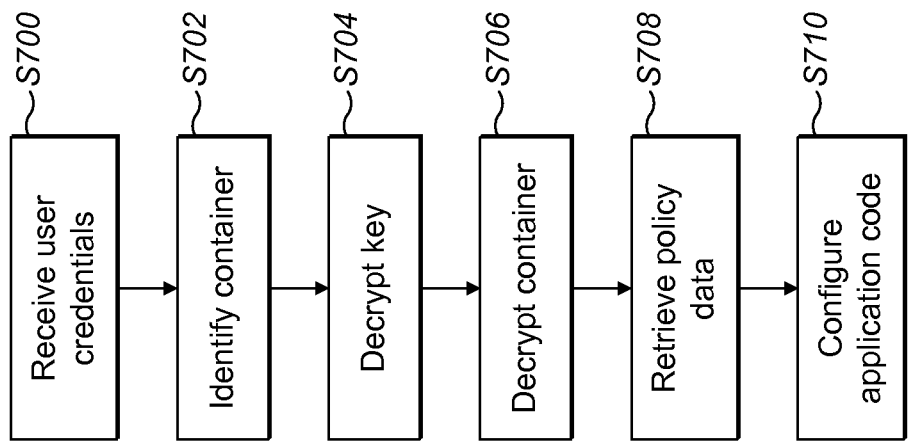
FIG. 7 is a flow diagram showing exemplary steps in a first process when a user logs in to an executable in accordance with an embodiment.

An exemplary process by which the user may subsequently be logged in to the executable 200x is now described with reference to FIG. 7. At step S700 the user terminal 100 receives user credentials via the UI 500. This may involve the user entering the password they have selected into the "enter password" field 504 in the UI 500, if he or she is the current user as indicated by indication 502. If he or she is not the current user, they may select the "change user" option 506, and enter their username and password, respectively, into the username field 514 and password field 516 shown in FIG. 5c. In some cases the user may be presented with a list of usernames for selection, for example from a pull-down menu. This may be the case if the user identifiers are stored on the user device 100.

At step S702 the library 202 identifies the container associated with the username; this may be done with reference to the list of associations between user identifiers and containers mentioned above. Alternatively or additionally, for example in the case that a user identifier is associated with more than one container, it could be done by attempting to decrypt the data included in each of the containers, until one such container is successfully decrypted.

The user device 100 then decrypts the DEK associated with the container identified at step S704. The decrypted DEK is then used to decrypt the data stored in the container 400 at step S706. This allows the user device 100 to access management data stored in the management part of the container; the management data may be updated in response to the data in the container 400 being decrypted, for example by retrieving management data from the NOC 304, if a connection is available. In other cases, the management data may be received from an enterprise server 314, 316, 318 located at an enterprise with which the user is associated; information included in the management part of the container may indicate the server (by means of, for example, a network address thereof) from which the management data is to be retrieved. It should be noted that different containers relating to the same executable 200x on the same user terminal 100 may be associated with different enterprises, and accordingly the enterprise server from which the user terminal 100 retrieves the policy data may be different for different user identifiers.

At step S708, the user device 100 determines, based on the management data, whether or not the user has access privileges to the application code 402. This may be based on a version number of the application and/or the particular platform from which the user is attempting to access the application code 402. If it is determined that the user does have the correct privileges to use the application embodied by the application the application code 402, the application part of the container is decrypted, providing access to the application data (for example, by retrieving same from the file system). The application code 402 is then configured with the application data at step S710, enabling the user to make use of the functionality of the executable 200x using content and settings specific to that user. If the application code 402 is encrypted using a key held in the container, then step S710 may comprise decrypting the data using the appropriate key. It should be noted that entitlement to access the application code 402 is distinct from entitlement to access a particular container. If the application code 402 attempts to access a container to which the currently logged on user is not entitled, an error message or similar is returned.

Although in the above example, the library 202 associated with the application code 402 being accessed performed the authentication process, in some cases the authentication may be delegated to a library associated with a different executable. For example Ex1 200a may delegate authentication to Ex2 200b. In this case, when the user attempts to launch Ex1 200a, the Library1 202a may send an authentication request to Library2 202b. Library2 202b provides a user interface for authenticating the user, as described above with reference to FIGS. 5a to 5c. Assuming that authentication is successful, the Library2 202b provides a value to Library1 202a which acts as a replacement for the password entered by the user as described above. This replacement value may be stored in encrypted form in a container of Ex2 202b, and provided to Ex1 202a in response to the container being decrypted. In some cases different authentication delegates (i.e. the application/library to which the authentication is delegated) may be associated with different user identifiers.

This may be determined by policy, so that the user identifier is associated with an identifier of the appropriate authentication delegate.

If associations between user identifiers and application identifiers for different respective authentication delegates are stored in unencrypted form on the user terminal 100, this may undesirably reveal information regarding the associated end user. For example, if the authentication delegate is a known high security application, this may reveal to a third party that the end user is part of a high security group.

In order to address this problem, a list of all delegate identifiers associated with the executable being accessed (in this example, Ex1 200*a*) may be stored in unencrypted form on the user device 100. In order to avoid the user identifiers being stored in unencrypted form, and revealing the correspondence between the user identifiers and the authentication delegates, device, the list may indicate a unique value, for example a hash value, which can only be derived from within a context when unlocked. For any contexts which do not use authentication delegation, this fact may be indicated in the list. When a user attempts to launch Ex1 200*a*, the following process is then performed. First, Ex1 200*a* checks the list which it is associated, and performs one of the following actions:
  a) If the list indicates that none of the user identifiers require authentication delegation, then the authentication user interface provided by Library1 202*a* is opened.
  b) If the list indicates that all user identifiers require authentication delegation by the same authentication delegate, then the authentication user interface associated with that delegate is opened.
  c) Otherwise, a list of all authentication options (i.e. all authentication delegates indicated in the list along with an option to authenticate using the executable being accessed Ex1 200*a*) is presented to the user. The user selects the appropriate option and authenticates accordingly.

The user selection avoids a need to associate individual user identifiers with authentication delegate identifiers, preventing a third party from discerning which user uses which authentication delegate. Further, a copy of the list may be held in encrypted form in a container which is decrypted subsequent to successful authentication via the delegate. The user device 100 checks the copy of the list held in the container against that held in unencrypted form. If it finds any differences between the two lists, this suggests that an attacker may have gained access to the device, so the user device 100 may take some action to prevent further access to the executable 200*x*, such as deleting the one or more of the user files 400*a*, 400*b* and/or containers 402*a*, 402*b*.

Figure 8:
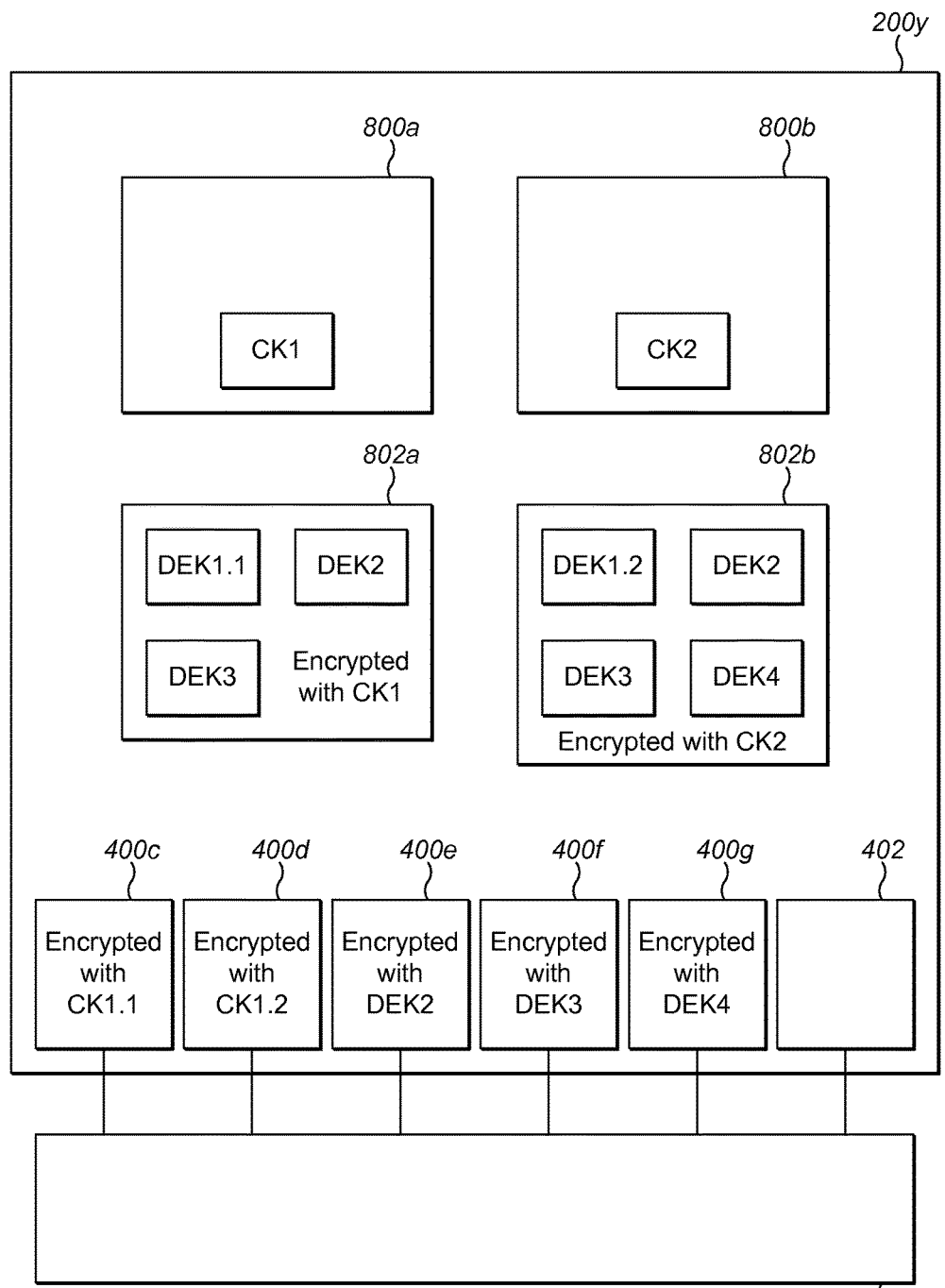
FIG. 8 is schematic diagram illustrating a second example of an executable in accordance with an embodiment.

FIG. 8 schematically shows a further example of an executable 200*y* in accordance with an embodiment. The executable 200*y* corresponds to any of the executables 200*a*, 200*b* and 200*c* described above. The executable 200*y* includes multiple subsets of data, including containers 400*c* to 400*g*, which may include the same content and/or have the same structure as those described above in relation to FIG. 4, and application code 402 corresponding to same described above in relation to FIG. 4. The executable 200*y* also includes subsets of data in the form of user files 800*a* and 800*b*, corresponding to the user files described above in relation to FIG. 4. The executable 200*y* includes further subsets of data, herein referred to as "contexts" 802*a* and 802*b*. The contexts 802*a* and 802*b* each comprise multiple data encryption keys (DEK) each of which is used to decrypt a respective one of the containers 400*c* to 400*g*. The DEKs are held in the contexts 802*a* and 802*b* in encrypted form. The containers 802*a* and 802*b* may be decrypted using container keys (CK) held in the respective user files 800*a* and 800*b*. The data included in the user files 800*a* and 800*b* is itself held in encrypted form, and may be decrypted using a user key which may be derived from a user password as described above.

Executables including multiple contexts are referred to herein as "multi-context executables 200*y*"; executables as per that described above in relation to FIG. 4, which may be thought of as including only a single context may be referred to as "single-context executables 200*x*". It should be noted that while the user files 800*a*, 800*b* and the contexts 802*a*, 802*b* are shown separately, in many cases the contexts 802*a*, 802*b* may be thought of as being logically included in the respective user files 800*a*, 800*b*.

Further, while, as discussed below, the use of separate CKs and DEKs may improve data security, in some embodiments, the CK are not used. In the latter case, the DEKs are stored in the user files 800*a*, 800*b*, with the user files 800*a*, 800*b* acting as contexts 802*a*, 802*b*, there being no separate contexts and user files. In these embodiments, the structure of the multi-context executable 200*y* is similar to that of the single-context executable 200*x*, with the difference that in the multi-context executable 200*y* the user files may each hold more than one DEK, whereas in the single-context executable they each hold only one. In the following discussions, it to be understood that references to contexts include user files acting as contexts, in accordance with these embodiments.

The executable 200*y* may also be associated with a library 202, corresponding to the library 202 described above.

In this example, context 802*a* includes DEK1.1, DEK2 and DEK3 corresponding to containers 400*c*, 400*e* and 400*f* respectively; and context 802*b* includes DEK1.2, DEK2, DEK3 and DEK4 corresponding to containers 400*d*, 400*e*, 400*f* and 400*g* respectively. In this example, containers 400*c* and 400*d* are configured to include separate instances of content, for example settings and other configuration data associated with a respective user; containers including separate instances of containers are herein referred to as "instance containers". Each of containers 400*e* and 400*f* incudes content which may be accessed via either context 802*a* or context 802*b*, which share common DEKs, DEK2 and DEK3; containers including shared content are referred to herein as "shared containers". The content of a shared container may comprise, for example, a list of contact details, such as a list of e-mail addresses of members of an enterprise. Using shared containers avoids storing (and in many cases retrieving) multiple copies of the same content on the user device 100, saving resources. Shared containers are typically shared between users associated with the same enterprise. However, in some cases, users associated with different enterprises may share containers.

Container 400*g* is only accessible via context 802*b*. This may be because, for example, it contains sensitive data which the user associated with context 802*b* is entitled to access, but the user associated with context 802*a* is not entitled to access.

In this embodiment, the same UI 500 as described above in relation to FIGS. 5*a* and 5*b* may be used for users activating and logging on. The processes followed when the "activate new user" option is selected to verify entered user credentials, user entitlement, exchange communications keys, retrieval of security policies may be the same as described above. Further, authentication delegation may be used as described above.

An exemplary process for generating a context 802 and container 400 structure when a user selects the "activate new user" option and the user (herein referred to as an "initial user") is the first user to activate the executable 200*y* is now described with reference to FIG. 9.

At step S900, the user device 100 generates a CK. This may be done using a process as described above in relation to the generation of a DEK in FIG. 6. At step S902, the CK is encrypted using the password supplied by the user, as described above, and stored, thereby generating a user file 800.

At step S904, the user device 100 generates one or more DEKs corresponding to one or more containers to be created. The DEKs may also be generated using a process as described above in relation to the generation of a DEK in FIG. 6. The user device 100 encrypts the DEKs using the CK generated in step S906, thereby generating a context 802 for the user. At step S908 the user device 100 generates one or more containers by encrypting the data to be stored in the respective containers using the one or more DEKs generated at S904.

As described above in relation to the single-context executable 200*x*, the first activation by the initial user may result in particular policy data being received, for example from an enterprise server 314, indicating any restrictions on further activations and further generation of new contexts and so on.

Figure 9:
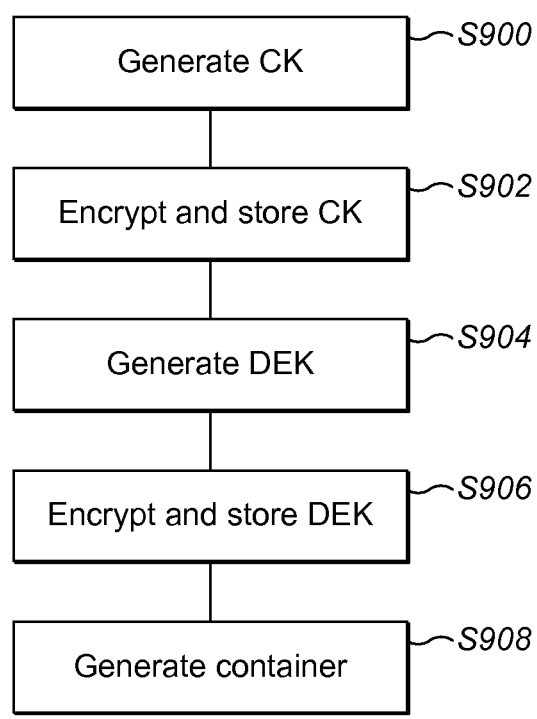
FIG. 9 is a flow diagram showing exemplary steps in a second process for generating a container associated with a user identifier in accordance with an embodiment.

The process when a user (herein referred to as a "new user") who is not the first user to activate the executable 200*y* selects the "activate new user" option differs from the process described in relation to FIG. 9 in that, in the former case, any DEKs generated for shared containers must be retrieved in order that they can be stored in the context for the new user.

One method of retrieving the relevant DEK may be referred to as "direct retrieval". In a direct retrieval method, the initial user first provides their password which enables decryption of the CK associated with the initial user. In turn, the decrypted CK can be used to decrypt the DEK stored in the initial user's context. The decrypted DEK can then be stored in the new user's context, encrypted with the CK associated with the new user.

In another method, which may be referred to as an "enterprise retrieval" method, an additional key, herein referred to as a "next user key" (NUK) is generated and provided by, for example, an enterprise server 314, 316, 318 with which the initial user is associated. A copy of any DEK relating to a shared container is encrypted using the NUK and stored on the user device 100 when the DEK is generated in the process described above in relation to FIG. 9. When a new user activates the executable 200*y*, the executable 200*y* requests the appropriate NUK from the enterprise server 314, 316, 318. On receipt of the NUK, the user device 100 uses same to decrypt the DEK, enabling the latter to be stored in the new user's context. The enterprise retrieval method has the advantage that it does not require the presence of the initial user.

On receipt of the request for the NUK, the enterprise server 312, 314, 316 may check whether the new user is entitled to access the relevant shared container and reject the request if the new user is not so entitled, or if the relevant container is not a shared container.

In an exemplary login process, a user provides user credentials from which a user key is derived as described above. The user device 100 then uses the user key to decrypt a user file 800*a* or 800*b*. The user file corresponding to the user logging in may be identified using a list of associations between user identifiers (e.g. usernames) and user files, which may be stored in the library 201, for example. Alternatively, the user device 100 may attempt to decrypt user files using the user key, until one of the user files is successfully decrypted. As is also described above, an alternative system may be used in which the location of a user file is derivable from a respective user identifier. For example, a user identifier may be used as the input to a hashing algorithm which provides the location of the user file as the output. In the case of a single user identifier being associated with multiple user files, the locations of each of the multiple user files is derived from the user ID; the user terminal 100 then attempts to decrypt each of the located user files until one is successfully decrypted.

Figure 10:
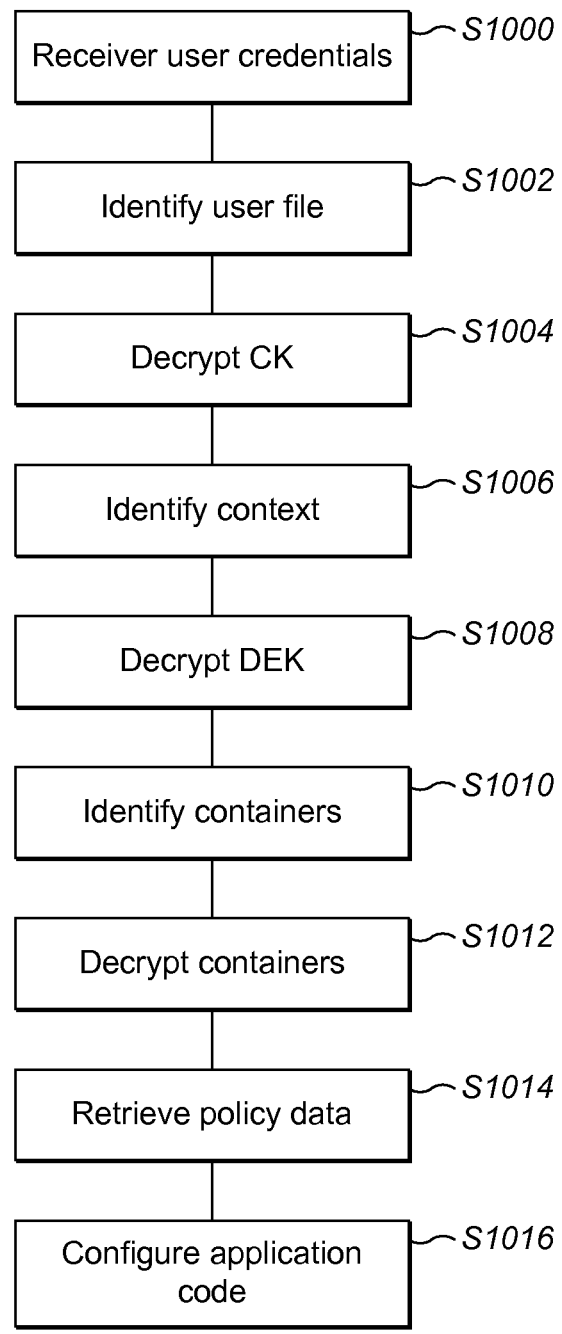
FIG. 10 is a flow diagram showing exemplary steps in a second process when a user logs in to an executable in accordance with an embodiment.

An exemplary process by which the user may subsequently be logged in to the executable 200*y* is now described with reference to FIG. 10. At step S1000 the user terminal 100 receives user credentials via the UI 500. This may involve the user entering the password they have selected into the "enter password" field 504 in the UI 500, if he or she is the current user as indicated by indication 502. If he or she is not the current user, they may select the "change user" option 506, and enter their username and password, respectively, into the username field 514 and password field 516 shown in FIG. 5*c*.

At step S1002 the library 201 identifies the user file associated with the username; this may be done with reference to a list of associations between user identifiers and user files 800 mentioned above. Alternatively, it could be done by attempting to decrypt the data included in each of the user files, until one such user file is successfully decrypted.

The user device 100 then decrypts, using the password provided by the user, the identified user file, including the container key CK, at step S1004. At step S1006, the user device 100 identifies the context to which the decrypted CK relates. This may be done using data stored in the decrypted user file, which may include an indicator of a location of the relevant container. Alternatively, it could be done by attempting to decrypt the data included in each of the contexts, until one such context is successfully decrypted.

At step S1008, the user device 100 decrypts the identified context, including the one or more DEKs included therein, using the decrypted CK. At step S1010, the user device 100 identifies the user container or containers to which the one or more DEKs relate. This may be done using data identifying the location of the containers same stored in the decrypted context. Alternatively, it could be done by attempting to decrypt the data included in each of the containers, until the container corresponding to each of the decrypted DEKs is successfully decrypted.

At step S1012, the user device 100 decrypts, using the one or more decrypted DEKs, the data stored in the containers to which they relate. This allows the user device 100 to access management data, such as policy data stored in the management part of the container; the management data may be updated in response to the data in the container 400 being decrypted, for example by retrieving management data from the NOC 304, if a connection is available. In other cases, the management data may be received from an enterprise server 314, 316, 318 located at an enterprise with which the user is associated; information included in the management part of the container may indicate the server (by means of, for example, a network address thereof) from which the management data is to be retrieved. It should be noted that different contexts and containers relating to the same executable 200*y* on the same user terminal 100 may be associated with different enterprises, and accordingly the enterprise server from which the user terminal 100 retrieves the management data may be different for different user identifiers. Some management data may be shared between all users of the same enterprise.

Examples of Management Data Include:
i) credentials and configuration data used to connect to a platform or infrastructure elements, such as the NOC 304 and/or an enterprise server 314, 316, 318;
ii) policy settings which specify an authentication (for example, whether to use authentication delegation and, if so, the application to which authentication is to be delegated) and/or controls other aspects of the usage of the executable, for example whether the user is entitled to access the executable;
iii) credentials used to authenticate the user to a server.

The data in i) and ii) are typically specific to a particular context, whereas the data in iii) is typically specific to a particular container.

At step S1014, the user device 100 determines, based on the management data retrieved from the NOC 304 (see item ii) above), whether or not the user has access privileges to the application code 402. This may be based on a version number of the application and/or the particular platform from which the user is attempting to access the application code 402. If it is determined that the user does have the correct privileges to use the application embodied by the application code 402, the application part of the container is decrypted, providing access to the application data (for example, by retrieving same from the file system). The application code 402 is then configured with the application data at step S1016, enabling the user to make use of the functionality of the executable 200y using content and settings specific to that user. If the application code 402 is encrypted using a key held in the container, then step S1016 may comprise decrypting the data using the appropriate key.

In the process described above, one or more CKs and DEKs are decrypted, on the basis of a user password, to provide access to a container. The successive decryption of the CKs followed by the DEKs improves security by making it more difficult for an attacker to discern the relationship between, for example, individual user identifiers and containers. However, as mentioned above, in some embodiments, CKs are not used, with DEKs instead being stored in user files. In these embodiments, the process described above with reference to FIG. 10, and other processes described herein are modified as appropriate.

Figure 11:
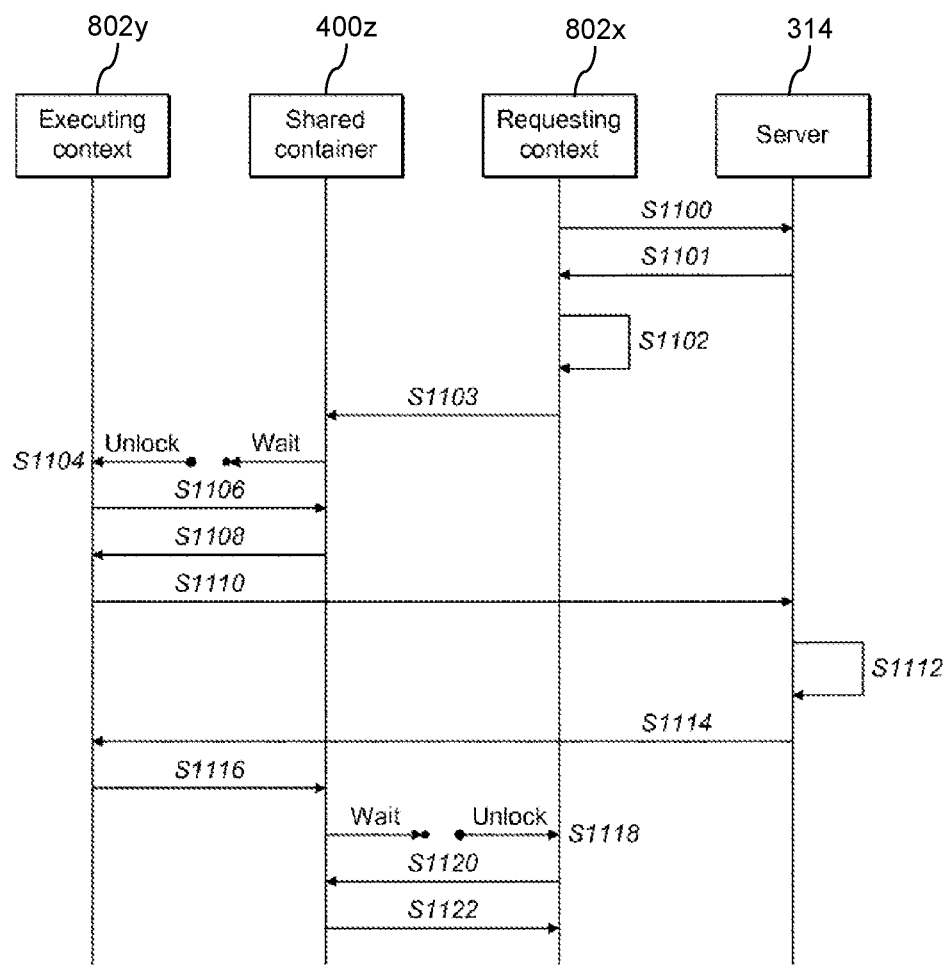
FIG. 11 is a sequence diagram showing a process in which a service requested by one context is executed by another context.

A particular use of a shared container is that it may enable instructions to execute a requested service to be delegated between contexts, so that one context instructs performance of a service on behalf of another context. For example, data applicable to one context may be downloaded when another context is unlocked, without the data being accessible in unencrypted form in the latter context. Herein, references to a context being "unlocked" mean that the relevant context has been decrypted and that the application code 402 is configured according to data contained in one or more containers that have been decrypted using DEKs held in the decrypted context. References to a context "performing" a stated action mean that the action is performed when the context is unlocked and the application code 402 is configured accordingly, FIG. 11 is a sequence diagram showing an example of a process in which a request is generated in a requesting context 802x and executed in an executing context 802y, using a shared container 400z to which the requesting context 802x and the executing context 802y both have access. The shared container 400z may be a dedicated container used only for the purposes of delegating requests as described herein, or may additionally be used for other purposes as described above. In the present example, the request being delegated is a request for a server, specifically enterprise server 314, to perform a service, for example to provide data.

At step S1100 the requesting context 802x sends a request to the server 314 to perform the service on instruction at some future time. The server 314 stores an identifier of the requested service and sends a response message to the requesting context 802x at step S1101, the response message including authentication data such as a challenge, which may be subsequently used to identify the requested service to the server.

At step S1102, the requesting context 802x generates an instruction to perform the requested service. The instruction may be generated in response to a user selection, for example, a user selection to request data from the server 314. The requesting context 802x may generate the instruction, rather than simply contacting the server for execution of the service, if the requesting context 802x is unable to execute the request, for example because the user device 100 is not connected to a network via which it is able to connect to the server 314. In another example, it may be that the service cannot be executed by the server 314 at the time that the instruction is generated because, for example, the service involves retrieval of information which is not available at the time the instruction is generated. In this case, the instruction may include an indicator of a time at or after which the service may be executed.

The instruction also typically includes data indicating an address, for example a URL, of the server 314 which is to perform the service.

Authentication information, such as an authentication token generated on the basis of the challenge received from the server 314 at step S1101, may be included in the instruction.

The requesting context 802x stores the request in encrypted form in the shared container 400z, using the DEK for that container 400z, at step S1103. This may be done as part of a logging out procedure in which the user associated with context 802x logs out, for example, or it may be done in response to the requesting context 802x determining that it cannot execute the request, as described above for example.

Once the request has been stored in the shared container 400z it may be retrieved and executed by either the requesting context 802x or the executing context 802y, whichever is next both unlocked and able to execute the request, for example because the user device 100 is now connected to a network via which it can connect to the server 314, or because information relating to the requested service is now available. In the present example, the executing context is unlocked at step S1104.

At step S1106 the executing context 802y decrypts the shared container 400z and at step S1108 retrieves the instruction stored by the requesting context 802x.

Since the instruction is an instruction to execute a service at the server 314, at step S1110, the executing context 802y establishes a connection with the server 314, using the address included in the instruction as described above, for example, and sends a request including, where applicable, the authentication information such as the authentication token, to the server 314.

At step S1112 the server 314 authenticates the request, where applicable, and performs the requested service.

At step S1114, the server 314 sends results data to the executing context 802y. The results data is data that results from the performance of the requested service. For example, if the requested service is to retrieve data, the results data may be the retrieved data. In other cases, the results data may be an indication that the requested service has, or has not, been successfully executed, for example.

The results data may be encrypted. Typically the results data is encrypted using an asymmetric encryption technique, for example, a public-private key encryption technique. The requesting context 802x may previously have provided the public key to the server 314. The server 314 may store the public key, identify same on receipt of the request, using authentication information contained therein for example, and encrypt the results data using the identified public key.

On receipt of the results data, the executing context 802y encrypts the same using the DEK for the shared container 400z and stores the results in the shared container, at step S1116. It should be noted that, in the case that the results data is encrypted by the server 314, the executing context 802y is unable to decrypt the results data, and the results data therefore may not be viewed in the executing context 802y. This enables the service to be executed on behalf of the requesting context 802x without compromising security and/or confidentiality.

Once the requesting context 802x is unlocked, it may decrypt shared container 400z at step S1120 and retrieve the results data at step S1122. If the results data has been encrypted by the server 314, the requesting context 802x may decrypt the results data, using the private key corresponding to the public key used by the server 314, for example.

Although in the above example, the service to be performed was requested in advance by the requesting context 802x, in some cases this may not be necessary. For example, the instruction generated by the requesting context 802x at step S1102 may simply specify the service to be performed, along with credentials associated with the requesting context, which the latter may have negotiated with the server performing the request. These credentials are typically not available to the executing context. This may be the case for example, where the service is the provision of information which is provided, in response to a periodic request (for example, a subscription).

In either case, the instruction may be encrypted so that it may be decrypted by the server 314, but not the executing context 802y. This may be done using one or more public-private key pairs, for example. In this case, the executing context 802y then encrypts the instruction using a public key and sends the encrypted instructions to server 314, which decrypts the instruction using the corresponding private key and executes the identified service. Similarly, the server 314 may encrypt the results data using a public key, the corresponding private key being held by the requesting context.

Although in the above examples the instructed service was a service to be performed by an external device in the form of a server, in some cases the instructed service may be executed internally on the user device 100, for example by the operating system of the user device 100.

In some cases, it may be advantageous to delete data associated with an executable, for example data associated with a particular user or in some cases just some of the contexts associated with a particular user. This may be the case for example when a user associated with a particular context is no longer authorized to access the executable 200y or loses entitlement to data included in a particular container, or when a user fears his or her password has become known to a third party.

In order to facilitate this, data identifying locations of files may be stored on the user device. As mentioned above in relation to the single-context executable 200x, information may be stored indicating associations between containers and user identifiers, and between the user file and the container to which it relates. This information may take the form of a file, herein referred to as a "container management (CM) file". The information may be stored in an instance container associated with each context for the executable 200y, or it may be stored in a shared container, for example. In the case of a multi-context executable 200y, the CM file may include data indicating one or more of the following:

1) User identifiers and the respective locations of corresponding user files for all or a subset of users identifiers activated on the user device 100.
2) The locations of some or all contexts held on the user device 100.
3) The locations of some or all of the containers held on the user device 100.
4) The relationship between contexts and corresponding containers (i.e. an indication of the containers which may be unlocked by DEKs stored in a corresponding context).
5) The relationship between users and corresponding contexts (i.e. an indication of the contexts which may be unlocked by CKs stored in a corresponding user file).

In order that the CM file not be available to an attacker, it is typically held in encrypted form in a container on the user device. A copy of the CM may be held in a container corresponding to each user ID, so that it is available whenever a user is logged in. In some embodiments, the user identifiers are stored in hashed form, in order to improve privacy.

When it has been identified that data is to be deleted, a command, herein referred to as a "wipe command" is received at the user device 100. This command may be received via a user interface, from a currently logged-user for example, or it may be received from a server, such as an enterprise server 314, 316, 318. In the case that all data associated with a user identifier is to be deleted, the wipe command includes an indication of appropriate user identifier. The CM file is then used to identify the corresponding user files and, where appropriate, the user's context(s) and/or containers. Note that shared containers associated with a user identifier are typically not deleted. Whether or not a container is a shared container may also be determined from the CM file; for example, containers may be explicitly identified as shared containers, or the associations between, containers and user files and/or contexts may be used to identify shared containers.

In the case that only a specific context is to be deleted, or where only a subset of the containers associated with a user identifier are to be deleted, the wipe command includes an indication of the context(s) and/or container(s) to be deleted. The CM file is then used to identify the appropriate data for deletion.

In embodiments where copies of CM file are stored in containers associated with each user identifier, data associated with a user may be deleted even where he or she is not logged in.

Figure 12:
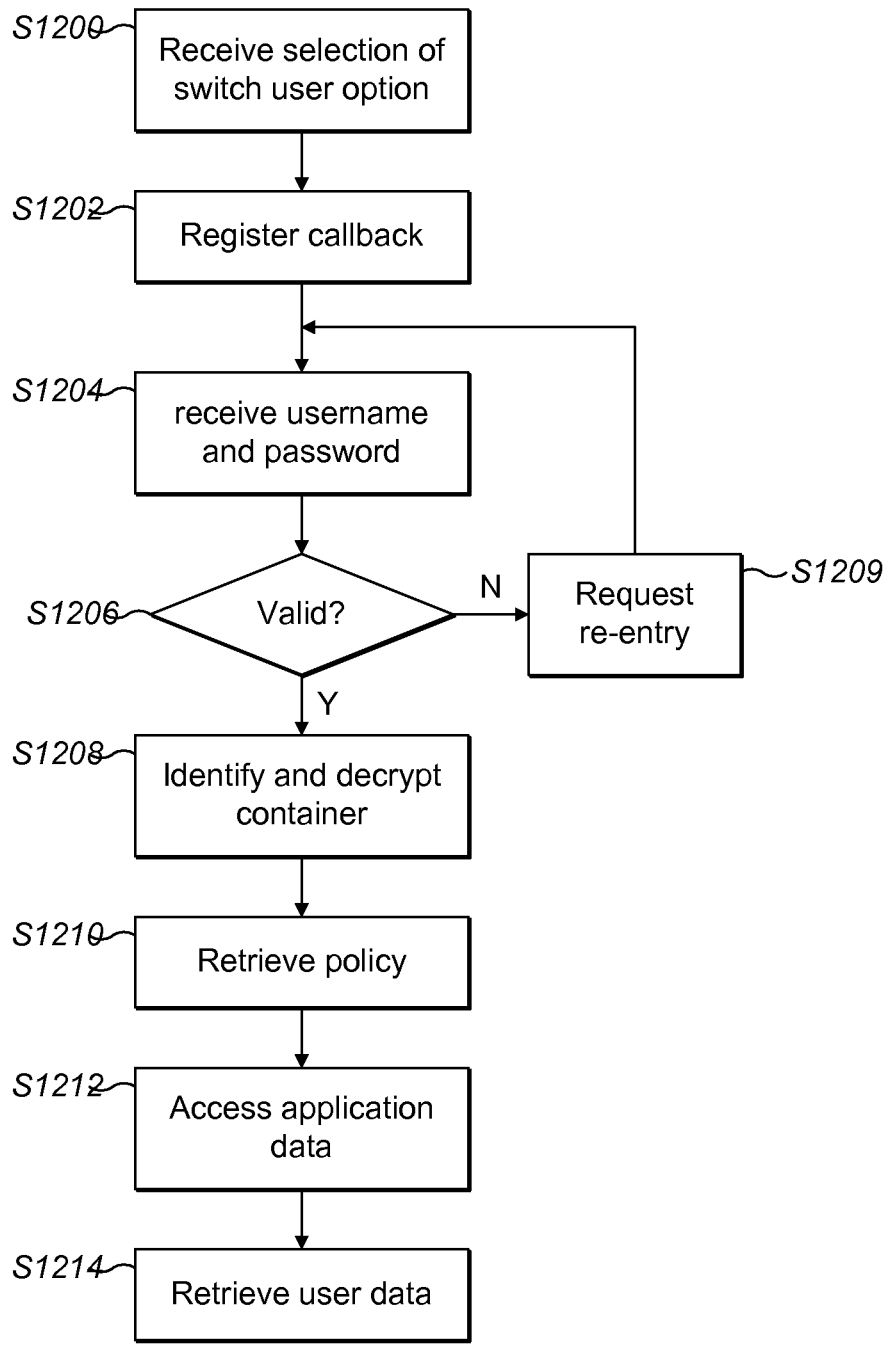
FIG. 12 is a flow diagram showing exemplary steps performed when changing users in accordance with an embodiment.

FIG. 12 is a flow diagram showing exemplary steps performed when changing users in accordance with an embodiment. Unless indicated otherwise, the features of the processes described here with reference to FIG. 12 apply both to embodiments using a single-context executable 200x and embodiments using a multi-context executable.

At step S1200 the library 202 receives, via the UI 500, a selection of the "change user" option 506. On receipt of the selection, the library 202 issues at step S1202 an instruction to the application code 402 to a registered callback to save application data (i.e. save the current state of the application) and to shut down and restart, the callback having been pre-registered by the application code 402. The application data (e.g. data indicating a location or locations within the file system of user specific data and/or the user specific data itself) is encrypted using the application key and stored as described above. A single callback to shut down and restart may be used as described above, or separate callbacks could be used in relation to the shut down and then restart.

It should be noted that the saving of application data is not necessarily performed only as part of a process of changing users. It may be performed when a user is logged out (e.g. manually logged out, or automatically logged out due to a predetermined time period expiring) without another logging in, and/or it may be performed in response to a user action such as selection of a save button, or automatically, for example at predetermined intervals.

At step S1204, the library 202 receives from a user an input of a username in the username field 514 and of a password in the password field 516. This may take the form of, for example, a selection from a list of users or, more preferably from a security perspective, may involve the user typing in the appropriate username.

At step S1206, the library 202 verifies whether the entered username and password combination are valid. This may be done by, for example, comparing the entered username with a register of stored usernames on the user device 100, identifying the container 400 associated with the username, decrypting a key according to the process described above, and attempting to decrypt the container 400 using the generated management key. If the entered username does not match with any that are registered on the user device 100 (e.g. in the list referred to above), or if the decryption of the identified container is not successful, the user may be prompted to re-enter their username and password at step S1209. The process described with reference to steps S1204 and S1206 may then be repeated with the re-entered data. The user may be denied access to the executable 200 if an invalid username/password combination are entered a predetermined number of times, for example.

If the entered username and password combination are valid, the corresponding container 400 is identified and decrypted at step S1208, as described above. In embodiments in which a multi-context executable 200y is used, this step may include the multiple steps of identifying and decrypting a user file and context described above with reference to FIG. 10.

At step S1210, if a connection to the enterprise server 314, 316, 318 and/or NOC 304, as appropriate, is available, management data including the entitlement of the user to access the application code 402 is retrieved. If the management data indicates that the user is not so entitled, the application key corresponding to the application code 402 is deleted from the management part of the container 400.

Assuming that the user is entitled to use the application embodied by the application code 402, at step S1212 the application data is accessed using the relevant application key, as described above.

At step S1214, application data stored on behalf of the user is decrypted using the management key, enabling user-specific data, such as content and/or settings data to be retrieved. This decrypted data is used to configure the application code 402 so that the application is presented for use by the user having settings and data content as it was when the user previously interacted with the application (i.e. as it was saved prior to another user logging in).

It should be noted that where authentication delegation is used, the authentication delegate may itself be a multi-user application in accordance with embodiments. In this case, if the user is not currently logged in to the authentication delegate, a process to switch users as described above may be implemented. In embodiments, the processes described above enable users to log in to individual applications, without any operating system log in. Data associated with the state of a given application is stored on a user-by-user basis, and encrypted using user-specific encryption keys. This ensures that data associated with one user is not inadvertently shared with another user. Further, policy and data compliance rules and/or mobile device management etc. may be implemented on a user by user basis with respect to the same application on the same user terminal 100. The policy data retrieved from the NOC 304 or enterprise server 314, 316, 318 as described above may indicate a change in access authorization associated with a particular user identifier. For example, if a user associated with a user identifier is no longer authorized to access a particular application (for example, because they are no longer employed by a particular enterprise) the data indicating this may be retrieved by the user terminal 100 and implemented by, for example, deleting the application key stored in the management part of the container 402.

In one example, multiple users may use the same application on the same user terminal to perform tasks such as gathering data, for example medical professionals gathering data relating to patients. In this case, the above processes may ensure that data accessible to one user (medical professional) is not accessible by another user (medical professional).

In another example, user may work for multiple enterprises and use the same application for work relating to each enterprise. In this case, the user may use different usernames and/or passwords for different enterprises, and the above processes may inhibit data leaking between different enterprises and/or allow policy, mobile device management and the like to be implemented separately for the different enterprises.

It should be noted that although reference is made herein to "changing users" and "different users" and the like, in some cases the same user may use different user identifiers. References to different users should therefore be understood as referring to different user identifiers (e.g. different usernames), and does not necessarily imply different human users. The same user may use different identifiers in the case that he or she uses the same device for different purposes, as described in the background to the invention section described above for example.

In another example, a user may have authentication credentials specifically for use in the case that he or she wishes to give the appearance of having logged in, without enabling access to the full range of data to which logging in would normally provide access. This may be the case where the user is being forced to log in by a nefarious third party for example. This type of login under duress is herein referred to as a "duress" login, in contrast with a "normal" login which provides access to the full range of resources to which the user normally is entitled to access. Typically, a duress login uses the same user ID, but a different password, to the corresponding normal login.

In the case of a single context executable 200x, for example, container 400a may be accessed using a user's normal login details, with 400b being accessed using the same user's duress login details. The "duress" container 400b may provide access to only a subset of the resources to which the "full access" container 400a provides access. For example container 400b may not provide access to sensitive data to which container 400a does provide access so that when logged in under duress, the user does not reveal this sensitive data to third parties.

Figure 13A:
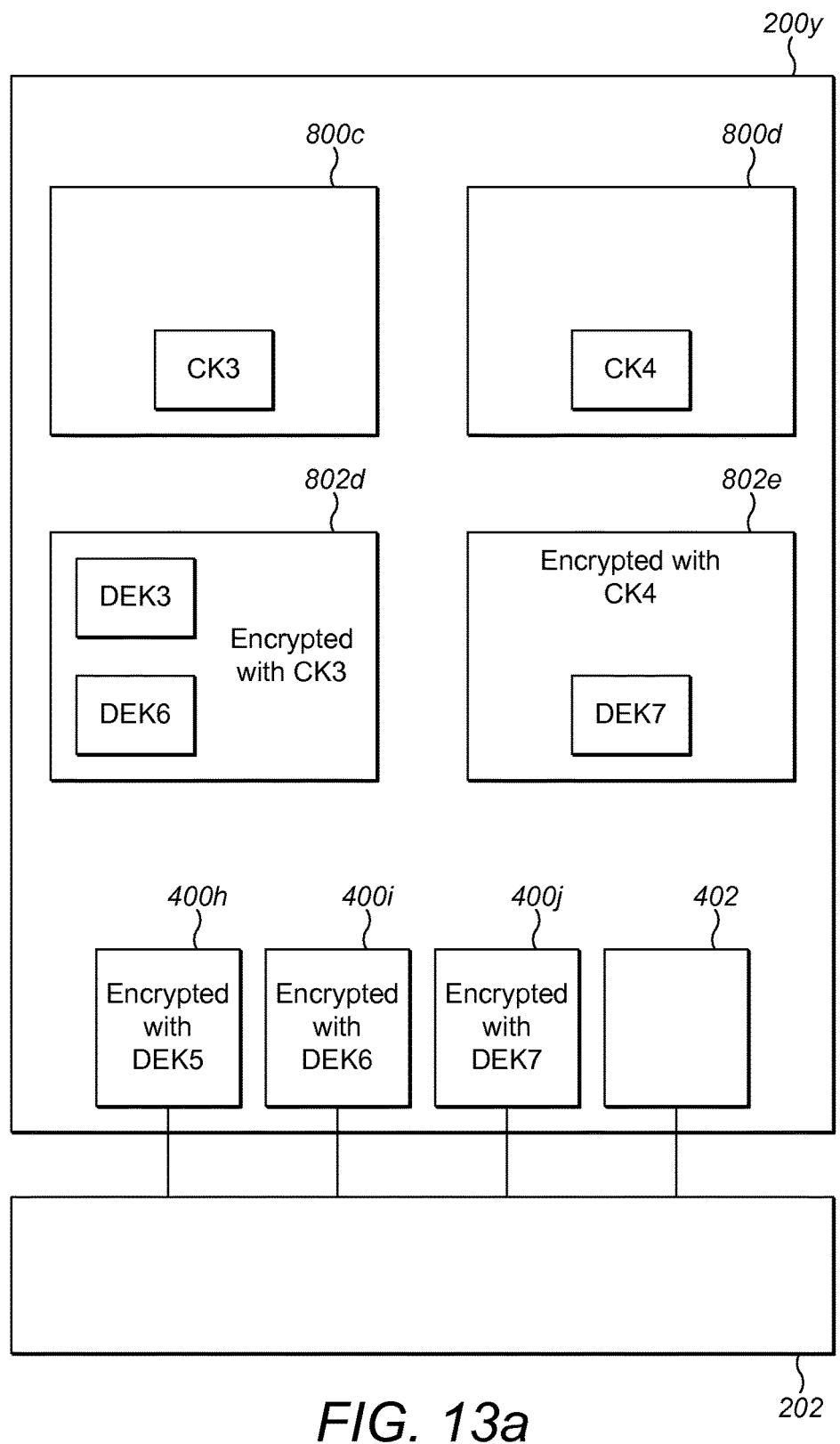
FIGS. 13*a* and 13*b* are schematic diagrams illustrating further examples of executables according to embodiments.

Similarly, in the case of a multi-context executable 200y, a normal login may result in one or more containers being unlocked, which are entirely different to the one or more container 400 which are unlocked by a duress login. FIG. 13a illustrates an example. In this example a normal login results in user file 800c being decrypted, resulting in context 802d being decrypted, which provides the DEKs to decrypt containers 400h and 400i. In contrast, a duress login results in user file 800d being decrypted, resulting in context 802e being decrypted, which provides the DEKs to decrypt container 400j, but not either container 400h or container 400i. Container 400j may provide access to only a subset of the resources to which container 400h provides access, for example.

Figure 13B:
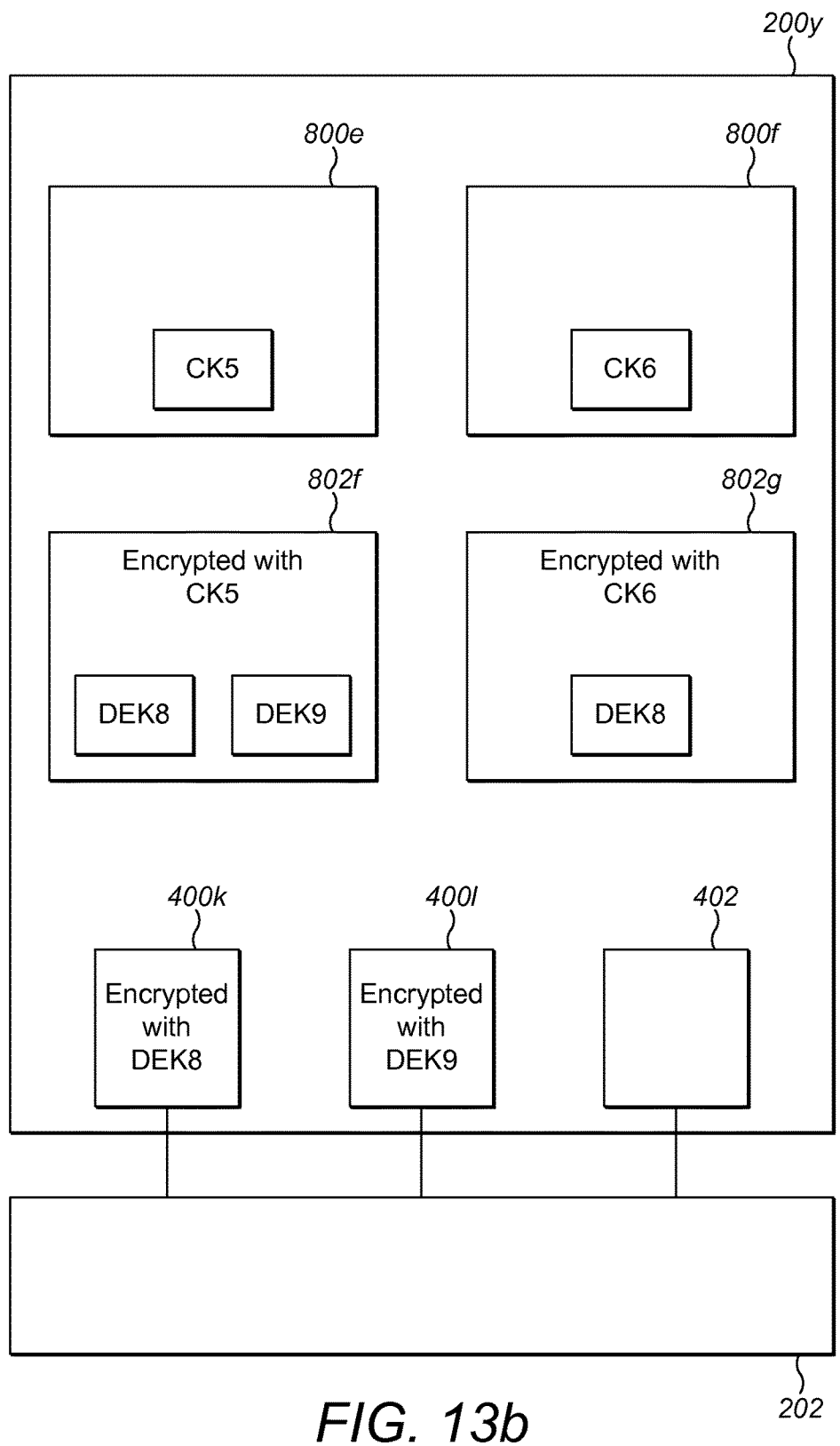

In another example, a duress login may provide access to only a subset of the containers which are accessible by normal login. FIG. 13b illustrates an example. In this example, a normal login provides access to containers 400k and 400l, via user file 800e and context 802f, whereas a duress login only provides access to container 400k, via user file 800f and context 802g.

If authentication delegation is used as described above, a duress login typically uses the same authentication delegate as the normal login. Both the authentication delegate and the executable making the delegation are configured appropriately for the duress login.

In some cases, it is convenient for one application to interact with one or more other applications in order to obtain services from the same. For example, in the case that an application associated with executable Ex1 200a is a word processing service it may determine that it requires a printing service in response to a user selection of a printing option. Library1 202a may store entries indicating the applications held on the user terminal 100, and indicating services that may be executed, on request, by corresponding applications. Library1 202a may store other information, such as address information relating to the address of the service providing applications.

Figure 14:
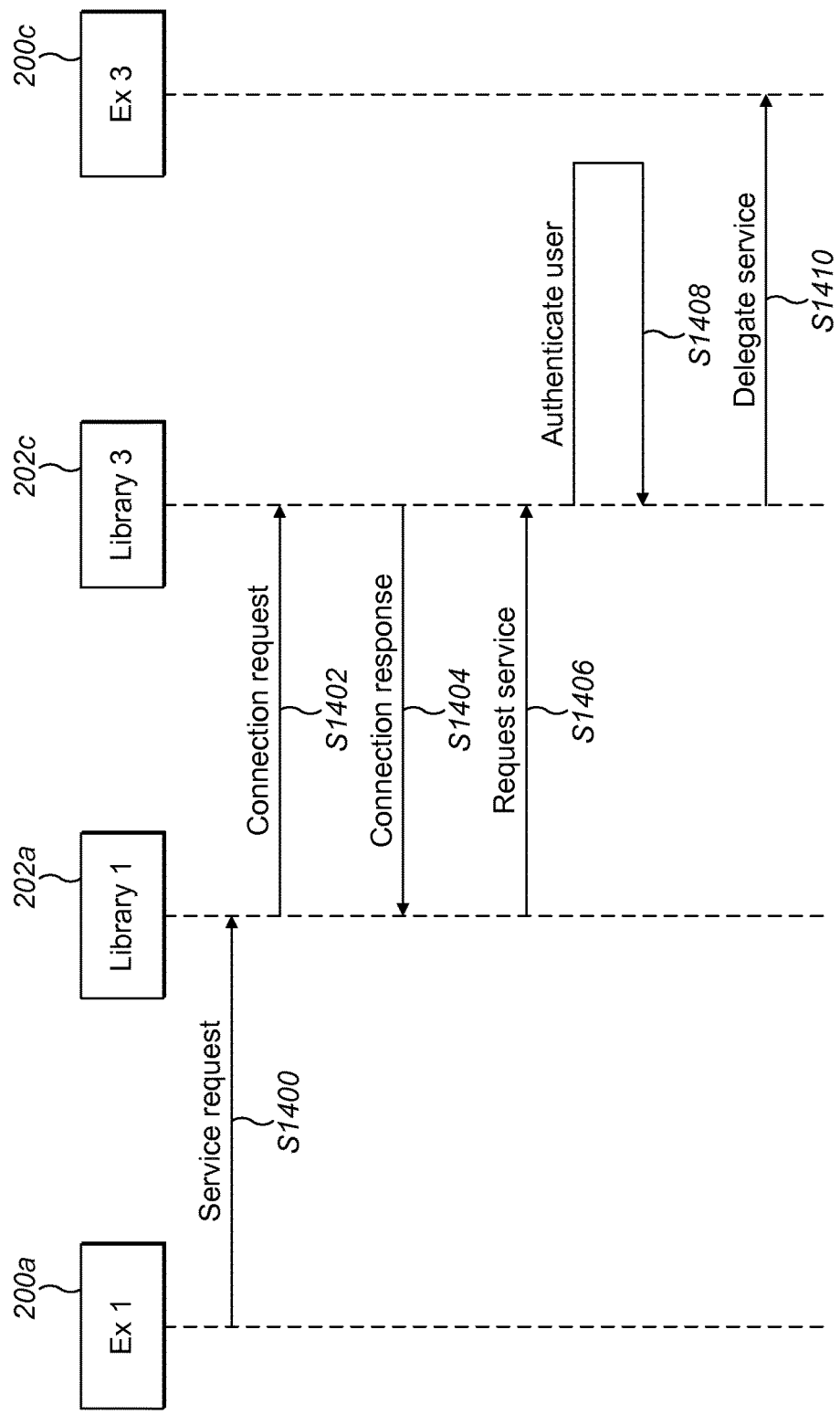
FIG. 14 is a message flow diagram illustrating exemplary steps performed in an inter-application interaction in accordance with an embodiment.

In some embodiments of the present invention, interaction between applications is enabled while observing the appropriate entitlement policies for a given user. An example of Ex1 200a delegating a service to Ex3 200c is now described with reference to FIG. 14.

If the application code 402 of Ex1 200a determines that a given service is required, it sends a request to the library 202 at step S1400 including a service identifier identifying the given service.

As described above, the Library1 202a has stored in memory entries indicating services available on the user terminal 100 and executables which are configured to execute those services. Based on the received service identifier, the Library1 202a determines whether there are any applications available to the application code 402 which are configured to use the service.

In the case that Library1 202a identifies multiple applications configured to execute the requested service, it may send a list of corresponding identifiers to the application code 402 of Ex1 200a. The application code 402 then selects one of the applications. This selection may be made at random, or the first listed application may be selected, for example. In another example, the application code 402 may provide the user with an option to select one of the listed applications.

Once an application has been identified, Library1 202a and the library corresponding to the identified application (in this case Library3 202c) set up a connection between the corresponding executables (specifically, between the appropriate application code 402 included in the corresponding executables). Setting up the connection involves Library1 202a sending a connection request at step S1402 and Library3 202c sending a connection response at step S1404. The connection request and connection response may each include a certificate; this may enable the respective applications to determine whether they are authorized to interact with one another, by for example validating whether both certificates are signed by the same authority (e.g. the same enterprise).

Once the connection between the respective executables has been established, Library1 202a sends a "Request Service" message to Library3 202c at step S1406. The Request Service message includes a service identifier of the requested service and, along with, where appropriate, a version identifier, a function identifier identifying a particular function requested etc. The Request Service message also includes an identifier of the user logged in to Ex1 200a. The identifier may be the username, for example. Library3 202c authenticates the user at step S1408. This may involve determining whether the user is already logged in to Ex3 200c; if the user is already logged in, then he or she is automatically authenticated without requiring the provision of any credentials. However, if the user is not already logged in (for example, if the user has not previously logged in to Ex3 200c, if they have previously logged in, but a predetermined time has expired, or if another user has logged in), then the user logs in by providing credentials to Library3 202c as described above.

If the user is successfully authenticated at step S1408, Library3 202c then passes the Request Service message on to the application code 402 in Ex3 200c at step S1410. The request may subsequently be processed and the result of the processing returned to the requesting application code 402 in Ex1 200a via the respective libraries.

The above some embodiments are to be understood as illustrative examples of the invention. Further some embodiments of the invention are envisaged. For example, although in the example of FIG. 5a a specific "activate new user" option 508 is provided, in some embodiments, this option is not provided. Instead, when user credentials are provided for the first time (for example, by entering a password in field 504 or username in field 514 and password field 516), the subsequent steps may be performed automatically on detecting that the user credentials are being provided for the first time.

Although it was described above with reference to FIG. 7 that, when switching users, the current state of the application for the user currently logged in is saved prior to the switch, in some cases the application may simply be shut down and restarted without the current state of the application being saved.

Although reference was made above to a data store 108 and a processor 106, it will be appreciated that the user terminal 100 may include more than one data store and/or more than one processor, arranged to perform the functions and processes described above in relation to the data store 108 and processor 106 respectively.

It was described above that various keys were generated at the user terminal 100. However, in some cases one or more of these keys may be generated on another device, such as the NOC 304.

It is to be understood that any feature described in relation to any one embodiment may be used alone, or in combination with other features described, and may also be used in combination with one or more features of any other of the some embodiments, or any combination of any other of the some embodiments. Furthermore, equivalents and modifications not described above may also be employed without departing from the scope of the invention, which is defined in the accompanying claims.

What is claimed is:

1. A computing device comprising one or more data stores and one or more processors, the one or more data stores being configured to store:
    an operating system of the computing device; and
    a set of code comprising first, second and third subsets of data, the first subset of data comprising first encrypted data and the second subset of data comprising second encrypted data, the first encrypted data being different from the second encrypted data, a first encrypted encryption key, and a second encrypted encryption key;
    a first plurality of subsets of encrypted data including the first subset of data;
    a first plurality of encryption keys, including the first encryption key, stored in encrypted form, wherein each of the first plurality of subsets of encrypted data can be decrypted using the respective one of the first plurality of encryption keys;
    a second plurality of subsets of encrypted data, the second plurality of subsets of encrypted data including the second subset of data; and
    a second plurality of encryption keys, including the second encryption key, stored in encrypted form, wherein each of the second plurality of subsets of encrypted data can be decrypted using a respective one of the second plurality of encryption keys;
    the first plurality of subset of encrypted data comprises at least one shared subset of encrypted data, the at least one shared subset of encrypted data being included in the second plurality of subsets of encrypted data, wherein the shared subset of encrypted data can be decrypted using a common encryption key, each of the first and second plurality of encryption keys include the common encryption key,
    wherein, in response to receipt of first authentication data for authenticating a first user, the computing device is arranged to:
        decrypt the first plurality of encrypted encryption keys, including the first encrypted encryption key;
        decrypt each of the first plurality of subsets of encrypted data using the decrypted first plurality of encryption keys, including decrypt the first encrypted data to generate first decrypted data using the first decrypted encryption key; and
        in response to decrypting each of the first plurality of subsets of encrypted data, configure the third subset of data in a first configuration, based on the decrypted first plurality of subsets of data, wherein the third subset of data is executable by the one or more processors using the operating system to perform one or more tasks on behalf of the first user; and
    wherein, in response to receipt of second authentication data for authenticating a second user, the second authentication data being different from the first authentication data, the computing device is arranged to:
        decrypt the second plurality of encrypted encryption keys, including the first encrypted encryption key;
        decrypt each of the second plurality of subsets of encrypted data using the decrypted second plurality of encryption keys, including decrypt the second encrypted data to generate second decrypted data using the second decrypted encryption key, wherein the second decrypted encryption key is different from the first decrypted encryption key; and
    in response to decrypting each of the second plurality of subsets of encrypted data, configure the third subset of data in a second configuration, based on the decrypted second plurality of subsets of data, wherein the third subset of data is executable by the one or more processors using the operating system to perform one or more tasks on behalf of the second user;
    in response to an instruction being generated by the third subset of data configured according to the first configuration, the computing device is arranged to:
        encrypt, using the common encryption key, the instruction to perform a service;
        store the encrypted instruction as data of the shared subset of encrypted data;
        decrypt the instruction using the common encryption key when the third subset of data is configured according to the second configuration;
        perform a process to obtain result data resulting from the performance of the service using the third subset of data configured according to the second configuration;
        encrypt the result data using the common encryption key;
        store the encrypted result data as data of the shared subset of encrypted data; and
        decrypt the encrypted result data using the common encryption key when the third subset of data is configured according to the first configuration.

2. The computing device according to claim 1, wherein the first subset of encrypted data is associated with a first user identifier and the second subset of encrypted data is associated with a second user identifier, different from the first user identifier.

3. The computing device according to claim 1, wherein the first subset of encrypted data is associated with a first user identifier and the second subset of encrypted data is associated with a second user identifier, wherein the first user identifier is the same as the second user identifier.

4. The computing device according to claim 1, wherein each of the first and second subsets of data comprises policy data indicative of a policy relating to a respective user identifier.

5. The computing device according to claim 4, wherein the third subset of data comprises executable code for executing a software application and the policy data includes data indicative of an entitlement of a user to access the software application.

6. The computing device according to claim 1, wherein each of the first and second subset of data includes communications keys for communicating with a remote server and/or data for logging in to a remote server.

7. The computing device according to claim 1, wherein: the one or more data stores includes data indicating an association between a first user identifier associated with the first user and the first subset of data; the first authentication data includes the first user identifier; and the computing device is arranged to identify the first subset of data on the basis of the first user identifier.

8. The computing device according to claim 1, wherein at least one of the first authentication data and second authentication data comprises a password received from a user via a user interface.

9. The computing device according to claim 1, wherein the first encrypted encryption key is encrypted on the basis of the first authentication data, and wherein the first subset of data is encrypted based on the first decrypted encryption key.

10. The computing device according to claim 1, wherein the third subset of data comprises executable code for executing one or more software applications, and the computing device is arranged to generate a further subset of data, the further subset of data comprising further encrypted data, different from the first and second encrypted data, and wherein, responsive to receipt of further authentication data for authenticating a further user, the computing device is arranged to decrypt said further encrypted data, and to configure the further subset of data based on the further decrypted data, wherein the third subset of data is executable by the one or more processors using the operating system to perform one or more tasks on behalf of the further user.

11. The computing device according to claim 1, wherein the first and second decrypted data each comprises application data relating to content and/or settings data associated with the first and second user identifiers, respectively.

12. The computing device according to claim 11, wherein the application data comprises data indicative of a location of the content and/or settings data in a file system of the computing device.

13. The computing device according to claim 11, wherein the first and second subsets of data each comprise a first part and a second part, wherein the first part includes a key, and the second part includes the application data encrypted on the basis of the key.

14. The computing device according to claim 11, wherein, subsequent to performing said one or more tasks on behalf of the first user, the computing device is arranged to store the user data generated in relation to the performance of the one or more tasks on behalf of the first user, in response to receiving a request to authenticate the second user.

15. The computing device according to claim 14, the computing device is arranged to retrieve the stored user data in response to a further receipt of the first authentication data.

16. The computing device according to claim 1 wherein the one or more data stores is arranged to store a first further encryption key in encrypted form and a second further key in encrypted form, wherein, responsive to receipt of the first authentication data, the computing device is arranged to:
use the first authentication data to decrypt the first further encryption key; and use the decrypted first further encryption key to decrypt the first plurality of encryption keys,
wherein, responsive to receipt of the second authentication data, the computing device is arranged to:
use the second authentication data to decrypt the second further encryption key; and
use the decrypted second further encryption key to decrypt the second plurality of encryption keys.

17. The computing device according to claim 1, wherein the service is a service to be performed by a server remote from the computing device, and the process comprises sending the instruction to the server and receiving the result data from the server.

18. The computing device according to claim 1, arranged to:
send, prior to generating said instruction, a request to a server to perform the service; and receive, from the server, authentication data associated with the request, wherein the instruction to perform the service includes said authentication data.

19. A non-transitory computer-readable storage medium comprising computer-executable instructions which, when executed by one or more processors, cause a computing device to perform a method of authenticating a user, the computing device comprising one or more data stores configured to store an operating system of the computing device, and the method comprising:
storing, in the one or more data stores, a set of code comprising first, second and third subsets of data, the first subset of data comprising first encrypted data and the second subset of data comprising second encrypted data, the first encrypted data being different from the second encrypted data, a first encrypted encryption key, and a second encrypted encryption key;
a first plurality of subsets of encrypted data including the first subset of data;
a first plurality of encryption keys, including the first encryption key, stored in encrypted form, wherein each of the first plurality of subsets of encrypted data can be decrypted using the respective one of the first plurality of encryption keys;
a second plurality of subsets of encrypted data, the second plurality of subsets of encrypted data including the second subset of data; and
a second plurality of encryption keys, including the second encryption key, stored in encrypted form, wherein each of the second plurality of subsets of encrypted data can be decrypted using a respective one of the second plurality of encryption keys;
the first plurality of subset of encrypted data comprises at least one shared subset of encrypted data, the at least one shared subset of encrypted data being included in the second plurality of subsets of encrypted data, wherein the shared subset of encrypted data can be decrypted using a common encryption key, each of the first and second plurality of encryption keys include the common encryption key;
in response to receipt of first authentication data for authenticating a first user, decrypting the first plurality of encrypted encryption keys including the first encrypted encryption key, decrypting each of the first plurality of subsets of encrypted data using the decrypted first plurality of encryption keys including decrypting the first encrypted data to generate first decrypted data using the first decrypted encryption key, and, in response to decrypting each of the first plurality of subsets of encrypted data, configuring the third subset of data in a first configuration, based on the decrypted first plurality of subsets of data, wherein the third subset of data is executable by the one or more processors using the operating system to perform one or more tasks on behalf of the first user; and
in response to receipt of second authentication data for authenticating a second user, the second authentication data being different from the first authentication data, decrypting the second plurality of encrypted encryption keys including the second encrypted encryption key, decrypting each of the second plurality of subsets of encrypted data using the decrypted second plurality of encryption keys, including decrypting the second encrypted data to generate second decrypted data using the second decrypted encryption key, wherein the second decrypted encryption key is different from the first decrypted encryption key, and, in response to decrypting each of the second plurality of subsets of encrypted data, configuring the third subset of data in a second configuration, based on the decrypted second plurality of subsets of data, wherein the third subset of data is executable by the one or more processors using the operating system to perform one or more tasks on behalf of the second user in response to an instruction being generated by the third subset of data configured according to the first configuration, the computing device is arranged to:

encrypt, using the common encryption key, the instruction to perform a service;

store the encrypted instruction as data of the shared subset of encrypted data;

decrypt the instruction using the common encryption key when the third subset of data is configured according to the second configuration;

perform a process to obtain result data resulting from the performance of the service using the third subset of data configured according to the second configuration;

encrypt the result data using the common encryption key;

store the encrypted result data as data of the shared subset of encrypted data; and decrypt the encrypted result data using the common encryption key when the third subset of data is configured according to the first configuration.

20. A method of authenticating a user at a computing device, the computing device comprising one or more data stores configured to store an operating system of the computing device, and the method comprising:

storing, in the one or more data stores, a set of code comprising first, second and third subsets of data, the first subset of data comprising first encrypted data and the second subset of data comprising second encrypted data, the first encrypted data being different from the second encrypted data, a first encrypted encryption key, and a second encrypted encryption key;

a first plurality of subsets of encrypted data including the first subset of data;

a first plurality of encryption keys, including the first encryption key, stored in encrypted form, wherein each of the first plurality of subsets of encrypted data can be decrypted using the respective one of the first plurality of encryption keys;

a second plurality of subsets of encrypted data, the second plurality of subsets of encrypted data including the second subset of data; and a second plurality of encryption keys, including the second encryption key, stored in encrypted form, wherein each of the second plurality of subsets of encrypted data can be decrypted using a respective one of the second plurality of encryption keys;

the first plurality of subset of encrypted data comprises at least one shared subset of encrypted data, the at least one shared subset of encrypted data being included in the second plurality of subsets of encrypted data, wherein the shared subset of encrypted data can be decrypted using a common encryption key, each of the first and second plurality of encryption keys include the common encryption key;

in response to receipt of first authentication data for authenticating a first user, decrypting the first plurality of encrypted encryption keys including the first encrypted encryption key, decrypting each of the first plurality of subsets of encrypted data using the decrypted first plurality of encryption keys including decrypting the first encrypted data to generate first decrypted data using the first decrypted encryption key, and, in response to decrypting each of the first plurality of subsets of encrypted data, configuring the third subset of data in a first configuration, based on the decrypted first plurality of subsets of data, wherein the third subset of data is executable by one or more processors using the operating system to perform one or more tasks on behalf of the first user; and in response to receipt of second authentication data for authenticating a second user, the second authentication data being different from the first authentication data, decrypting the second plurality of encrypted encryption keys including the second encrypted encryption key, decrypting each of the second plurality of subsets of encrypted data using the decrypted second plurality of encryption keys, including decrypting the second encrypted data to generate second decrypted data using the second decrypted encryption key, wherein the second decrypted encryption key is different from the first decrypted encryption key, and, in response to decrypting each of the second plurality of subsets of encrypted data, configuring the third subset of data in a second configuration, based on the decrypted second plurality of subsets of data, wherein the third subset of data is executable by the one or more processors using the operating system to perform one or more tasks on behalf of the second user in response to an instruction being generated by the third subset of data configured according to the first configuration, the computing device is arranged to:

encrypt, using the common encryption key, the instruction to perform a service;

store the encrypted instruction as data of the shared subset of encrypted data;

decrypt the instruction using the common encryption key when the third subset of data is configured according to the second configuration;

perform a process to obtain result data resulting from the performance of the service using the third subset of data configured according to the second configuration;

encrypt the result data using the common encryption key;

store the encrypted result data as data of the shared subset of encrypted data; and decrypt the encrypted result data using the common encryption key when the third subset of data is configured according to the first configuration.

* * * * *